US011897222B2

(12) United States Patent
Langen

(10) Patent No.: US 11,897,222 B2
(45) **Date of Patent: *Feb. 13, 2024**

(54) METHOD AND APPARATUS FOR ERECTING CARTONS

(71) Applicant: H. J. Paul Langen, Brampton (CA)

(72) Inventor: H. J. Paul Langen, Brampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,405

(22) Filed: Jul. 5, 2022

(65) Prior Publication Data

US 2022/0332079 A1 Oct. 20, 2022

Related U.S. Application Data

(63) Continuation of application No. 16/677,139, filed on Nov. 7, 2019, now Pat. No. 11,390,049.

(51) Int. Cl.

| | |
|---|---|
| ***B31B 50/07*** | (2017.01) |
| ***B65H 5/08*** | (2006.01) |
| ***B31B 50/26*** | (2017.01) |
| ***B31B 50/02*** | (2017.01) |

(52) U.S. Cl.

CPC ............ *B31B 50/07* (2017.08); *B31B 50/022* (2017.08); *B31B 50/262* (2017.08); *B65H 5/08* (2013.01); *B65H 2701/1764* (2013.01)

(58) Field of Classification Search

CPC ....... B31B 50/02; B31B 50/022; B31B 50/04; B31B 50/06; B31B 50/07; B31B 50/26; B31B 50/262; B31B 50/48; B31B 50/60; B65B 3/02; B65B 3/025; B65B 7/26

USPC .................................... 53/458, 566; 493/313

See application file for complete search history.

(56) References Cited

U.S. PATENT DOCUMENTS

| | | | |
|---|---|---|---|
| 1,434,230 | A | 10/1922 | Richardson |
| 1,471,924 | A | 10/1923 | Saylor et al. |
| 2,786,316 | A | 3/1957 | Silva et al. |
| 2,869,297 | A | 1/1959 | Neer |
| 2,879,638 | A | 3/1959 | Hill |
| 2,900,778 | A | 8/1959 | Hartbauer |
| 2,902,810 | A | 9/1959 | McGihon |
| 3,292,813 | A | 12/1966 | Roegner |
| 3,461,642 | A | 8/1969 | Langen et al. |
| 3,619,967 | A | 11/1971 | Alduk |
| 3,698,151 | A | 10/1972 | Arneson |

(Continued)

FOREIGN PATENT DOCUMENTS

| | | | |
|---|---|---|---|
| CA | 270065 | C | 11/2007 |
| CA | 2712878 | C | 2/2011 |

(Continued)

OTHER PUBLICATIONS

"Picking: A logistics centre sectored in different areas", Video available online at: https://youtu.be/9KAXH-D05XU, Mar. 31, 2017.

(Continued)

*Primary Examiner* — Jacob A Smith

(57) ABSTRACT

In erecting a carton from a knock-down carton blank, the blank is placed on a base of a bed of a shuttle such that a bottom side panel of the blank abuts the base. The bottom side panel of the blank is then gripped with a gripper of the base and a top side panel of the blank is raised while advancing the shuttle in a horizontal direction so as to open said knock-down carton blank into a carton sleeve.

23 Claims, 25 Drawing Sheets

(56) References Cited

U.S. PATENT DOCUMENTS

| | | | |
|---|---|---|---|
| 3,757,486 | A | 9/1973 | Feurston et al. |
| 3,940,907 | A | 3/1976 | Ganz |
| 4,010,593 | A | 3/1977 | Graham |
| 4,031,817 | A | 6/1977 | Raschke |
| 4,061,081 | A | 12/1977 | Pinto et al. |
| 4,163,414 | A | 8/1979 | Bachman, Jr. et al. |
| 4,414,789 | A | 11/1983 | Pattarozzi |
| 4,553,954 | A | 11/1985 | Sewell et al. |
| 4,569,182 | A | 2/1986 | Leuvering |
| 4,823,539 | A | 4/1989 | Kuckhermann et al. |
| 4,915,678 | A | 4/1990 | Morita |
| 4,942,720 | A | 7/1990 | Berney |
| 5,024,640 | A | 6/1991 | Saitoh |
| 5,060,451 | A | 10/1991 | DeMay et al. |
| 5,061,231 | A | 10/1991 | Dietrich et al. |
| 5,105,600 | A | 4/1992 | DePoint, Jr. et al. |
| 5,106,359 | A | 4/1992 | Lott |
| 5,115,625 | A | 5/1992 | Barbulesco |
| 5,145,070 | A | 9/1992 | Pallett et al. |
| 5,207,630 | A | 5/1993 | Decker et al. |
| 5,341,626 | A | 8/1994 | Beckmann |
| 5,352,178 | A | 10/1994 | Pazdernik |
| 5,393,291 | A | 2/1995 | Wingerter |
| 5,411,464 | A | 5/1995 | Calvert et al. |
| 5,440,852 | A | 8/1995 | Lam |
| 5,456,570 | A | 10/1995 | Davis et al. |
| 5,624,368 | A | 4/1997 | Cromwell |
| 5,626,002 | A | 5/1997 | Ford et al. |
| 5,720,156 | A | 2/1998 | Bridges et al. |
| 5,997,458 | A | 12/1999 | Guttinger et al. |
| 6,032,853 | A | 3/2000 | Chevalier |
| 6,099,450 | A | 8/2000 | Schenone et al. |
| 6,226,965 | B1 | 5/2001 | Lam |
| 6,378,725 | B1 | 4/2002 | Andersson |
| 6,688,075 | B2 | 2/2004 | Cristina |
| 6,721,762 | B1 | 4/2004 | Levine et al. |
| 6,764,436 | B1 | 7/2004 | Mazurek |
| 6,799,671 | B1 | 10/2004 | Sanchez Gomez |
| 6,876,958 | B1 | 4/2005 | Chowdhury et al. |
| 6,912,762 | B2 | 7/2005 | Lile et al. |
| 6,913,568 | B2 | 7/2005 | Frank et al. |
| 6,968,668 | B1 | 11/2005 | Dimario et al. |
| 7,093,408 | B2 | 8/2006 | Duperray et al. |
| 7,131,941 | B2 | 11/2006 | Makar et al. |
| 7,174,698 | B2 | 2/2007 | Spatafora et al. |
| 7,243,481 | B2 | 7/2007 | Draghetti |
| 7,326,165 | B2 | 2/2008 | Baclija et al. |
| 7,404,788 | B2 | 7/2008 | Monti |
| 7,510,517 | B2 | 3/2009 | Goodman |
| 7,682,122 | B2 | 3/2010 | Maynard et al. |
| 7,720,567 | B2 | 5/2010 | Doke et al. |
| 7,788,881 | B2 | 9/2010 | Johnson et al. |
| 7,828,708 | B2 | 11/2010 | Huang et al. |
| 7,832,183 | B2 | 11/2010 | Jacob et al. |
| 7,988,406 | B2 | 8/2011 | Schafer |
| 7,991,505 | B2 | 8/2011 | Lert, Jr. et al. |
| 8,156,013 | B2 | 4/2012 | Dearlove et al. |
| 8,340,812 | B1 | 12/2012 | Tian et al. |
| 3,365,389 | A1 | 2/2013 | Taylor |
| 8,622,883 | B2 | 1/2014 | Flynn |
| 8,671,654 | B2 | 3/2014 | Langen |
| 8,961,380 | B2 | 2/2015 | Langen |
| 9,061,477 | B2 | 6/2015 | Chandaria |
| 9,090,400 | B2 | 7/2015 | Wurman et al. |
| 9,114,897 | B2 | 8/2015 | Kim et al. |
| 9,126,380 | B2 | 9/2015 | Dittmer et al. |
| 9,315,344 | B1 | 4/2016 | Lehmann |
| 9,336,509 | B1 | 5/2016 | Arun Singhal et al. |
| 9,714,145 | B1 | 7/2017 | Lehmann |
| 9,718,570 | B1 | 8/2017 | Ortiz et al. |
| 9,796,080 | B2 | 10/2017 | Lindbo et al. |
| 9,927,815 | B2 | 3/2018 | Nusser et al. |
| 9,975,699 | B2 | 5/2018 | Yamashita |
| 10,074,073 | B2 | 9/2018 | Stevens et al. |
| 10,233,019 | B2 | 3/2019 | Lert |
| 10,248,112 | B2 | 4/2019 | Zhu et al. |
| 10,471,597 | B1 | 11/2019 | Murphy et al. |
| 10,489,870 | B2 | 11/2019 | Asaria et al. |
| 10,556,713 | B2 | 2/2020 | Langen |
| 10,618,736 | B2 | 4/2020 | Khodl et al. |
| 2003/0200111 | A1 | 10/2003 | Damji |
| 2004/0112520 | A1 | 6/2004 | Hanschen et al. |
| 2004/0148911 | A1 | 8/2004 | Hermodsson et al. |
| 2004/0168408 | A1* | 9/2004 | Spatafora .............. B65B 43/185 53/566 |
| 2005/0079966 | A1 | 4/2005 | Moshier et al. |
| 2006/0096242 | A1 | 5/2006 | Makar et al. |
| 2006/0096712 | A1 | 5/2006 | Makar et al. |
| 2006/0277269 | A1 | 12/2006 | Dent et al. |
| 2007/0038673 | A1 | 2/2007 | Broussard et al. |
| 2007/0072755 | A1 | 3/2007 | Monti |
| 2007/0197364 | A1 | 8/2007 | Monti |
| 2007/0204567 | A1 | 9/2007 | Wintring et al. |
| 2008/0067225 | A1 | 3/2008 | Moore |
| 2008/0110135 | A1 | 5/2008 | Jacob et al. |
| 2008/0141632 | A1 | 6/2008 | Monti |
| 2009/0239726 | A1 | 9/2009 | Huang |
| 2009/0277134 | A1 | 11/2009 | Jacob et al. |
| 2009/0319395 | A1 | 12/2009 | Chandaria |
| 2010/0263333 | A1* | 10/2010 | Langen .................... B65D 5/02 53/563 |
| 2011/0111939 | A1 | 5/2011 | Bassi |
| 2011/0297559 | A1 | 12/2011 | Davis |
| 2013/0218799 | A1 | 8/2013 | Lehmann et al. |
| 2013/0247519 | A1 | 9/2013 | Clark et al. |
| 2014/0260119 | A1 | 9/2014 | Baltes et al. |
| 2015/0072847 | A1 | 3/2015 | Graham et al. |
| 2015/0072848 | A1 | 3/2015 | Graham et al. |
| 2015/0073587 | A1 | 3/2015 | Vliet et al. |
| 2015/0087491 | A1 | 3/2015 | Langen |
| 2015/0225104 | A1 | 8/2015 | Reed |
| 2015/0291295 | A1 | 10/2015 | Langen |
| 2015/0324893 | A1 | 11/2015 | Langen |
| 2016/0129587 | A1 | 5/2016 | Lindbo et al. |
| 2016/0304281 | A1 | 10/2016 | Elazary et al. |
| 2018/0065807 | A1 | 3/2018 | Lert, Jr. |
| 2018/0086019 | A1 | 3/2018 | Langen |
| 2018/0126683 | A1 | 5/2018 | Johnson et al. |
| 2018/0150793 | A1 | 5/2018 | Lert, Jr. et al. |
| 2018/0327161 | A1 | 11/2018 | Helms |
| 2019/0152703 | A1 | 5/2019 | Sellner et al. |
| 2019/0160774 | A1 | 5/2019 | Langen |
| 2020/0039744 | A1 | 2/2020 | Lert et al. |
| 2020/0087010 | A1 | 3/2020 | Almogy et al. |
| 2020/0254707 | A1 | 8/2020 | Iwasa et al. |
| 2020/0406570 | A1 | 12/2020 | Hirata et al. |
| 2021/0016905 | A1 | 1/2021 | Lindbo et al. |
| 2021/0237385 | A1 | 8/2021 | Fridolfsson |

FOREIGN PATENT DOCUMENTS

| | | | |
|---|---|---|---|
| CA | 3023959 | A1 | 11/2017 |
| CA | 3044850 | A1 | 6/2018 |
| CN | 108891698 | A * | 11/2018 |
| CN | 108891698 | A1 | 11/2018 |
| DE | 2250667 | C3 | 9/1980 |
| EP | 0559604 | A1 | 9/1993 |
| EP | 1177980 | A2 | 2/2002 |
| EP | 3337739 | B1 | 2/2020 |
| GB | 2 096 093 | A | 10/1982 |
| WO | 96/032322 | A1 | 10/1996 |
| WO | 2013/142106 | A1 | 9/2013 |
| WO | 2014/161644 | A2 | 10/2014 |
| WO | 2017/081281 | A | 5/2017 |
| WO | 2018/197400 | A1 | 11/2018 |
| WO | 2019/021281 | A2 | 1/2019 |

OTHER PUBLICATIONS

"E-Commerce Automation at Newegg's Robotic Distribution Center", Video available online at: https://youtu.be/ZBRoXW6YtGI, Oct. 16, 2018.

(56) References Cited

OTHER PUBLICATIONS

"Order Fulfillment Process", Video available online at: https://youtu.be/jqaJAfmBvBM, Mar. 7, 2015.
"AutoStore | The Future of Warehousing is Reality | English", Video available online at: https://youtu.be/b3X3r5UVtEM, Jul. 29, 2015.
Non-Final Office Action dated Mar. 3, 2022, issued in connection with the U.S. Appl. No. 16/262,163.
International Search Report issued by the Canadian Intellectual Property Office dated Jun. 27, 2013 in connection with International PCT Patent Application No. PCT/CA2013/000245 filed on Mar. 15, 2013, 5 pages.
Written Opinion of the International Searching Authority issued by the Canadian Intellectual Property Office dated Jun. 27, 2013 in connection with International PCT Patent Application No. PCT/CA2013/000245 filed on Mar. 15, 2013, 6 pages.
International Preliminary Report on Patentability issued by the International Bureau of WIPO dated Oct. 28, 2014 in connection with International PCT Patent Application No. PCT/CA2013/000245 filed on Mar. 15, 2013, 7 pages.
International Search Report issued by the Canadian Intellectual Property Office dated Feb. 12, 2021 in connection with International Patent Application No. PCT/CA2020/051502, 6 pages.
Written Opinion of the International Searching Authority issued by the Canadian Intellectual Property Office dated Feb. 12, 2021 in connection with International Patent Application No. PCT/CA2020/051502, 9 pages.
International Search Report issued by the Canadian Intellectual Property Office dated Nov. 30, 2021, in connection with International Patent Application No. PCT/CA2021/051193, 4 pages.
Written Opinion of the International Searching Authority issued by the Canadian Intellectual Property Office dated Nov. 30, 2021, in connection with International Patent Application No. PCT/CA2021/051193, 5 pages.
"Witron realizes automated logistics center of E.Leclerc Socara", Video available online at: https://youtu.be/qLCSHUqhnYs, Oct. 8, 2018.
"Thomann, New logistics centre for eCommerce-giant (english)", Video available online at: https://youtu.be/NRLpIXRqs78, Jun. 27, 2017.
"Inside a Warehouse Where Thousands of Robots Pack Groceries", Video available online at: https://youtu.be/4DKrcpa8Z_E, May 9, 2018.
"Inside Alibaba's smart warehouse staffed by robots", Video available online at: https://youtu.be/FBI4Y55V2Z4, Sep. 20, 2017.
"Automated warehouse solutions for CSH | SSI Schaefer", Video available online at: https://youtu.be/xKrQQYHMT-A, Oct. 8, 2018.
"Corrugated Boxes: How It's Made Step by Step Process | Georgia-Pacific", Video available online at: https://youtu.be/C5nNUPNVWAw, Mar. 16, 2015.
"AGV Automation—Food Industry", Video available online at: https://youtu.be/dVR8Qmq1Ytl, Nov. 7, 2016.
"RCE Random Robotic Case Erector Bottom Taper", Video available online at: https://youtu.be/WEHgWYnSDmk, Oct. 10, 2017.
Non-Final Office Action dated Apr. 19, 2022, mailed in connection with the U.S. Appl. No. 16/569,298.
Notice of Allowance dated Mar. 17, 2022, mailed in connection with the U.S. Appl. No. 16/677,139.
Non-Final Office Action dated Apr. 12, 2022, mailed in connection with the U.S. Appl. No. 16/808,140.
Xpak USA, LLC, Xpak Robox™—Robotic Random-Size Box Erector Brochure, http://www.xpakusa.com/pdf/XPAK%20-%20ROBOX%20Robotic%20Case%20Erector%20Model%20XP-E3000R.pdf (last printed Mar. 22, 2016).
Random Robotics Case Erector—obtained online https://motioncontrolsrobotics.com/product/random-robotic-case-erector/.
Robotics Case Erector and Installation Archive—obtained online from https://swspackaging.com/installations/robotic-case-erector-tote-tender-32217/.
"Pick2Pallet LED Light System—Designed for Order Picking", Video available online at: https://www.youtube.com/watch?v=msSBgPByolY, Jul. 11, 2017.
"Krones: Automatic order-picking system", Video available online at: https://www.youtube.com/watch?v=yU6OwsqETzl&t=84s, Feb. 15, 2010.
"New Concepts in Robotics for Distribution", Video available online at: https://www.youtube.com/watch?v=w7shAlf2Wjs, Apr. 19, 2011.
"DB Schenker implementing next generation e-commerce", Video available online at: https://www.youtube.com/watch?v=udr0OOxmPbc, Jan. 22, 2016.
"Advanced Automation with AutoStore Warehouse Robots", Video available online at: https://www.youtube.com/watch?v=ecftHVqxRpg&t=133s, Oct. 9, 2015.
"OPRA—Order Picking Robotic AGV", Video available online at: https://www.youtube.com/watch?v=yGhmOfAbi_U, Apr. 21, 2011.
"Smart automated machine loading with Pickit and Universal robots", Video available online at: https://www.youtube.com/watch?v=9fYcaisl1qY, Jun. 10, 2016.
"Pick it 3drobotvisionmadeeasy universalrobots depalletizing pallet crates flex", Video available online at: https://www.youtube.com/watch?v =- Js1DfvBq40, Jun. 9, 2016.
"Automated Bottle Pallet Unloader with FANUC Pick & Place Robot—Clear Automation", Video available online at: https://www.youtube.com/watch?v=qwbDX58FVFM, Sep. 2, 2016.
"Warehouse Pallet Robots and Pick Station", Video available online at: https://www.youtube.com/watch?v=S4H8_oX3sOY, Mar. 12, 2019.
"Swisslog ItemPiQ: Efficient robot-based automated item picking for order fulfillment", Video available online at: https://www.youtube.com/watch?v=qMsgnTq6C_s, Feb. 22, 2019.
"Solutech robot pallet picking", Video available online at: https://www.youtube.com/watch?v=rUrll1u64Qc, Mar. 26, 2015.
"Robotic order picking from pallets and flowracks by Robomotive", Video available online at: https://www.youtube.com/watch?v=O7641Lfo81c, Sep. 18, 2018.
"Full Layer Glass Bottle and Case Palletizer / Depalletizer", Video available online at: https://www.youtube.com/watch?v=PGajWaQ9jNg&t=75s, Dec. 17, 2013.
"Pack, Seal & Palletize—Garbage Bag Rolls", Video available online at: https://www.youtube.com/watch?v=qFHUX6bqXcg, Sep. 24, 2019.
"Robotic Palletizing Cell with Accumulation—HSC & RSC Cases", Video available online at: https://www.youtube.com/watch?v=mF0yF5hTrZ8, Dec. 18, 2019.
"VPick™ Robot Guidance for Mixed Case Depalletizing", Video available online at: https://www.youtube.com/watch?v=z-FbC2CMmus&t=60s, Apr. 19, 2019.
"AQFlex® XS: advanced performance and unique agility in a compact design", Video available online at: https://www.youtube.com/watch?v=prxl8DnJjTw, May 5, 2017.
"Intralox ARB Technology, Enabling Rapid Depalletizing (6 of 6)", Video available online at: https://www.youtube.com/watch?v=1kdMZCxiElc, Dec. 9, 2011.
"Depalletizing Robot | Autotec Solutions", Video available online at: https://www.youtube.com/watch?v=8yOsG4t41Hc, Jul. 17, 2018.
"Autotec Solutions", Video available online at: https://www.youtube.com/channel/UCEtJjzx-G7nGvYgKqB4yitg, Jun. 27, 2018.
"Intralox ARB Depalletizing Systems", Video available online at: https://www.youtube.com/watch?v=YIRbmxGlzj4, Mar. 31, 2014.
"Combi RCE Robotic Random Case Erector installed by SWS Packaging", Video available online at: https://youtu.be/9-W9gfCtZhE, Aug. 13, 2017.
"Palletizing and Depalletizing | Honeywell Intelligrated", Video available online at: https://www.youtube.com/watch?v=8nFn6xnnTbc&t=83s, Oct. 4, 2018.
"The Magic Bus: A fully automated can depalletizer with pallet management", Video available online at: https://www.youtube.com/watch?v=y073yPWZSx0&t=258s, Apr. 9, 2020.
"Dual Case Robotic Palletizing System with Corner Board Stretch Wrapper—Kaufman Engineered Systems", Video available online at: https://www.youtube.com/watch?v=h4tyZt2seVE, May 12, 2017.

(56) References Cited

OTHER PUBLICATIONS

"Automated Depalletizing System Uses FANUC Robots for Complex Depalletizing—PASCO", Video available online at: https://www.youtube.com/watch?v=VVz3xNIJYAk, Jan. 16, 2015.
"Automated Pallet Jack Order Selection.wmv", Video available online at: https://www.youtube.com/watch?v=g _-V31UL4Ww&t=98s, Mar. 5, 2010.
"System Logistics APPS: Automatic Pick to Pallet System", Video available online at: https://www.youtube.com/watch?v=v5bPGIgENP8, Oct. 15, 2013.
"A look inside one of Amazon's robotic fulfillment centers", Video available online at: https://youtu.be/YL9XjyXsKKk, Jan. 2, 2019.
"Poly bagmaker inserter FLEXIM-31", Video available online at: https://youtu.be/D88VRdm68mk, Mar. 20, 2017.
"Automatic Horizontal Baler / Baling Press Machine (HBA150-110130)", Video available online at: https://youtu.be/vLbAbSLBSyY, Jun. 28, 2018.
"Inside Amazon's Fulfillment Center in Kent, Washington", Video available online at: https://youtu.be/Zm0toTbg8J4, May 31, 2018.
"The Grand Theory of Amazon", Video available online at: https://youtu.be/UyohSu-Ft_U, Jun. 2, 2018.
"How Amazon Receives Your Inventory", Video available online at: https://youtu.be/dAXdeqcHBp4, Dec. 23, 2013.
"Inside an Amazon Warehouse on Cyber Monday", Video available online at: https://youtu.be/qRQwkJLRfWw, Nov. 28, 2016.
"Inside Edition Producer Goes Undercover to Deliver Amazon Packages", Video available online at: https://youtu.be/YzdEQJ9V-8M, Nov. 20, 2018.
"I went undercover as an Amazon delivery driver. Here's what I learned about the hidden costs of free shipping", Title retrieved at: https://www.thestar.com/news/investigations/2019/12/19/i-went-undercover-as-an-amazon-delivery-driver-heres-what-i-learned-about-the-hidden-costs-of-free-shipping.html, Dec. 19, 2019.
"Automated Decasing System Uses Six FANUC Robots to Decase Bottles—StrongPoint Automat", Video available online at: https://youtu.be/bTkz4RYkevQ, May 20, 2016.
"Automated labeling and palletizing, courtesy of StrongPoint Automation", Video available online at: https://youtu.be/X6ukaEe_vOM, Jan. 24, 2020.
"New Concepts in Robotics for Distribution", Video available online at: https://youtu.be/w7shAlf2Wjs, Apr. 19, 2011.
"Fruits Picking with FANUC", Video available online at: https://youtu.be/Xq2yTJs8NXI, Jun. 30, 2019.
"The Warehouse of the Future—WITRON's OPM Technology at Meijer in Wisconsin", Video available online at: https://youtu.be/bn5jjVKhFUs, Mar. 29, 2017.
Non-Final Office Action dated Aug. 17, 2021, mailed in connection with the U.S. Appl. No. 16/677,139.
Notice of Allowance mailed by the USPTO dated May 25, 2021, in the related U.S. Appl. No. 16/444,673.
International Search Report issued by the Canadian Intellectual Property Office dated Aug. 8, 2013, in connection with International PCT Patent Application No. PCT/CA2013/000230, 5 pages.
Written Opinion of the International Searching Authority issued by the Canadian Intellectual Property Office dated Aug. 8, 2013, in connection with International PCT Patent Application No. PCT/CA2013/000230, 8 pages.
International Preliminary Report on Patentability issued by the Canadian Intellectual Property Office dated May 26, 2015, In connection with International PCT Patent Application No. PCT/CA2013/000230, 9 pages.
Non-Final Office Action dated Apr. 10, 2023, mailed in the related U.S. Appl. No. 17/459,936.
Non-Final Office Action dated Mar. 26, 2018, mailed in the related U.S. Appl. No. 14/646,321.

* cited by examiner

METHOD AND APPARATUS FOR ERECTING CARTONS

CROSS-REFERENCE TO RELATED APPLICATION

This application is a Continuation of U.S. patent application Ser. No. 16/677,139, filed on Nov. 7, 2019, which is related to U.S. application Ser. No. 16/230,979, filed on Dec. 21, 2018, the contents of which are incorporated herein by reference.

FIELD

The present invention relates generally to methods and systems for forming containers.

BACKGROUND

Containers are used to package many different kinds of items. One form of container used in the packaging industry is what is known generically as a "box" and it can be used to hold various items including products and sometimes other boxes containing products. Some in the packaging industry refer to boxes used to package one or more products as "cartons". Also in the industry there are containers/boxes that are known by some as "cases". Examples of cases include what are known as regular slotted cases ("RSC"). Another type of container is what is known as a "tray" which generally is formed only on five sides and has a permanently open top. Some types of trays are used to hold other boxes or cartons; some types of trays are used to hold products (e.g. trays are sometimes used to hold bottled water). In this patent document, including the claims, the words "carton" and "cartons" and "containers" are used collectively to refer to boxes, cartons, trays, and/or cases that can be used to package any type of items including products and other cartons.

Cartons come in many different configurations and are made from a wide variety of materials. However, many cartons are foldable and are formed from a flattened state—commonly called a carton blank. Cartons may be made from an assortment of foldable materials, including but not limited to cardboard, chipboard, paperboard, corrugated fibreboard, other types of corrugated materials, plastic materials, composite materials, and the like and possibly even combinations thereof.

In many known systems, carton blanks may be serially retrieved from a carton magazine, and reconfigured from a flattened state into an erected state, and placed in a slot on a carton conveyor. The erected carton may then be moved by the carton conveyor to a loading station where the carton may be filled with one or more items and then sealed.

To permit the carton blanks to be readily opened up into an erected state from a flattened state, the blanks may be held in the magazine in a generally completely flattened configuration and then can be folded and sealed such as by gluing or taping panels and/or flaps together to form an erected carton. Specialized apparatus that can handle only flat, unfolded and unsealed blanks for cartons are known.

However, some blanks are provided to users not in a flat, unfolded and unsealed form, but rather in what is known as a "knock-down" blank or "KD". A KD blank may be provided in a folded configuration and be partially glued or otherwise sealed along one side seam thus being formed in a generally flattened tubular shape. Accordingly, each carton may require opposite panels to be pulled apart and reconfigured from a flattened tubular configuration to an open tubular configuration that is suitable for delivery to a carton conveyor. The carton blank may then have one side closed by folding and sealing the bottom flaps, and then be filled from the opposite side while on the carton conveyor. Also, any required additional flap folding and sealing such as with glue or tape can be carried out to enclose and completely close and seal the carton with one or more items contained therein. Alternately, for example the erected carton blank can be reoriented from a side orientation to an upright orientation with the opening facing upwards. The erected carton can then be moved to a loading station or loading system where it is top loaded with one or more items, such as products or other carton containing products. The top opening can then be closed by folding over and sealing the top flaps.

However, the forming of a carton ready to be filled with a product, using such a knock-down carton blank—i.e., a tubular carton blank that is flattened but partially glued along one side seam—has in the past involved quite complex machinery. Typically, tubular carton blanks are held in a magazine with the blanks being in an angled but generally downwardly disposed orientation. Another apparatus referred to as a carton erector or carton feeder fulfils the functions of retrieving the carton from the magazine, opening the flattened carton up into a generally tubular configuration, and then placing it on a carton conveyor. The carton feeder typically has suction cups and will move in a generally arcuate path between the various stations for retrieval, opening and discharge. Examples of such carton feeders are disclosed in U.S. Pat. No. 5,997,458 to Guttinger et al. issued Dec. 7, 1999, and U.S. Pat. No. 7,326,165 issued to Baclija et al. on Feb. 5, 2008, the contents of both of which are hereby incorporated herein in their entirety. Other similar types of carton erectors may retrieve blanks in series from a magazine using suctions cups, open the blanks using some other kind of mechanism such as carton breaker, and then feed the opened blanks to belt mechanisms which can pass the blanks to a carton conveyor to transport the blank. However, in such systems, difficulties arise in designing system components that can achieve a clean retrieval and handoff by the carton feeder/erectors apparatus.

In the formation of cartons from a corrugated or otherwise strengthened material such as a corrugated fibreboard material, it is also typically necessary as part of the forming process to fold over various parts of a blank made from a corrugated fibreboard material. However, current folding processes and machines are relatively complex.

Accordingly, an improved forming method and system is desirable which can readily form a container such as a carton from a generally flat blank.

SUMMARY

In an embodiment, in erecting a carton from a knock-down carton blank, the blank is placed on a base of a bed of a shuttle such that a bottom side panel of the blank abuts the base. The bottom side panel of the blank is then gripped with a gripper of the base and a top side panel of the blank is raised while advancing the shuttle in a horizontal direction so as to open said knock-down carton blank into a carton sleeve.

According to one aspect there is provided a method for use in erecting a carton, comprising: placing a knock-down carton blank on a base of a bed of a shuttle such that a bottom side panel of said knock-down carton blank abuts said base; gripping said bottom side panel of said blank with a gripper of said base; raising a top side panel of said knock-down carton blank while advancing said shuttle in a horizontal direction so as to open said knock-down carton blank into a carton sleeve.

According to another aspect, there is provided apparatus for use in erecting a carton, comprising: a shuttle having a bed with a horizontally extending base having base grippers; shuttle drive apparatus for driving said shuttle in a horizontal advancement direction; an end effector having end effector grippers; an end effector movement device for moving said end effector; a controller operatively associated with said shuttle drive apparatus, said end effector movement device and said grippers and configured to: operate said movement device and end effector to grip a top side panel of a knock-down carton blank and place said knock-down carton blank on said horizontally extending base of said shuttle such that a bottom side panel of said knock-down carton blank abuts said horizontally extending base; activate said base grippers to grip said bottom side panel of said blank; operate said movement device to raise said top side panel of said knock-down carton blank with said end effector while horizontally advancing said shuttle in order to open said knock-down carton blank into a carton sleeve.

Other aspects and features will become apparent to those of ordinary skill in the art upon review of the following description of specific embodiments of the invention in conjunction with the accompanying figures.

BRIEF DESCRIPTION OF THE DRAWINGS

In the figures which illustrate example embodiments.

DETAILED DESCRIPTION

Figure 1:
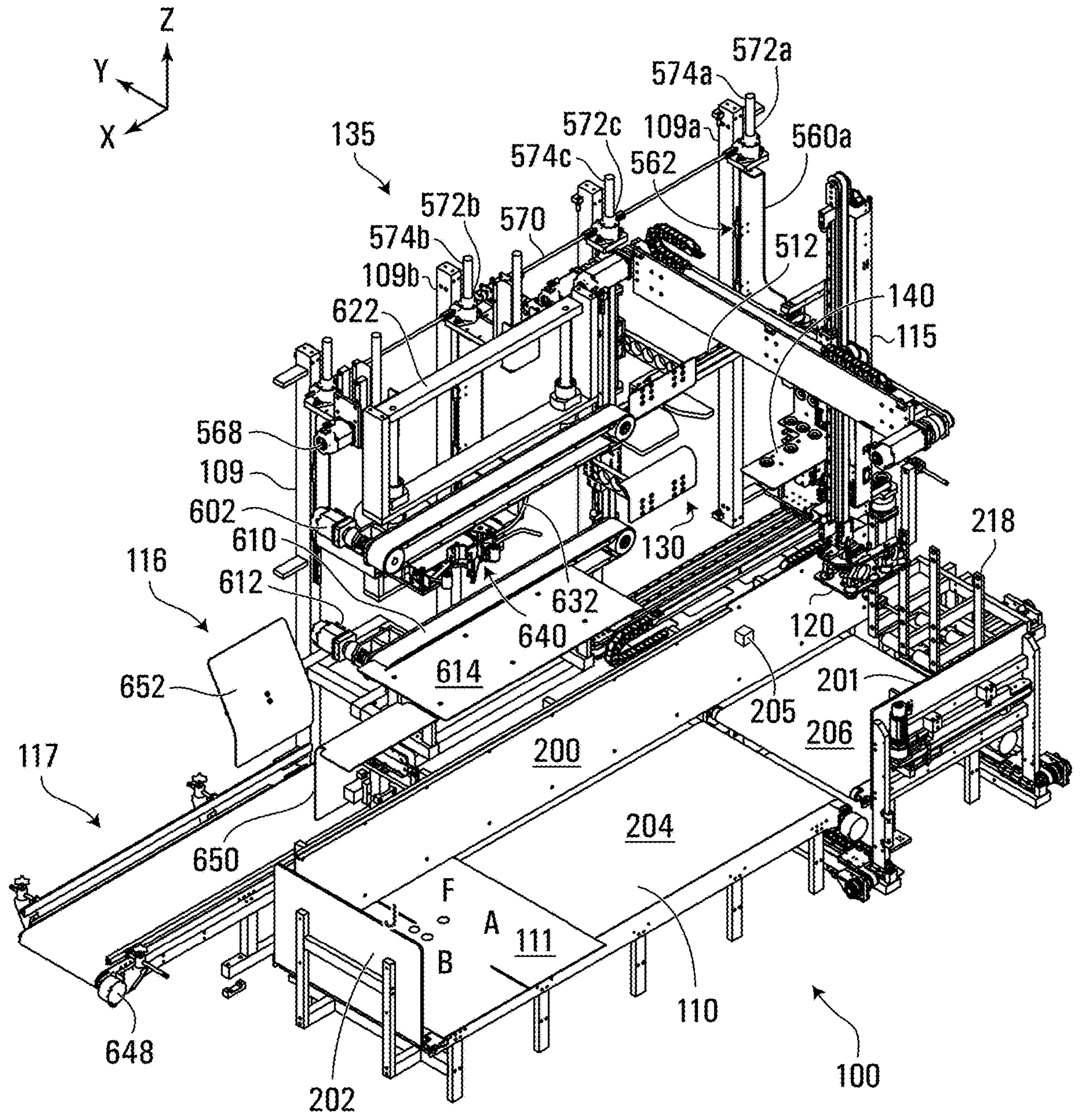
FIGS. 1 and 2 are top perspective views of a system made in accordance with an embodiment.
Figure 2:
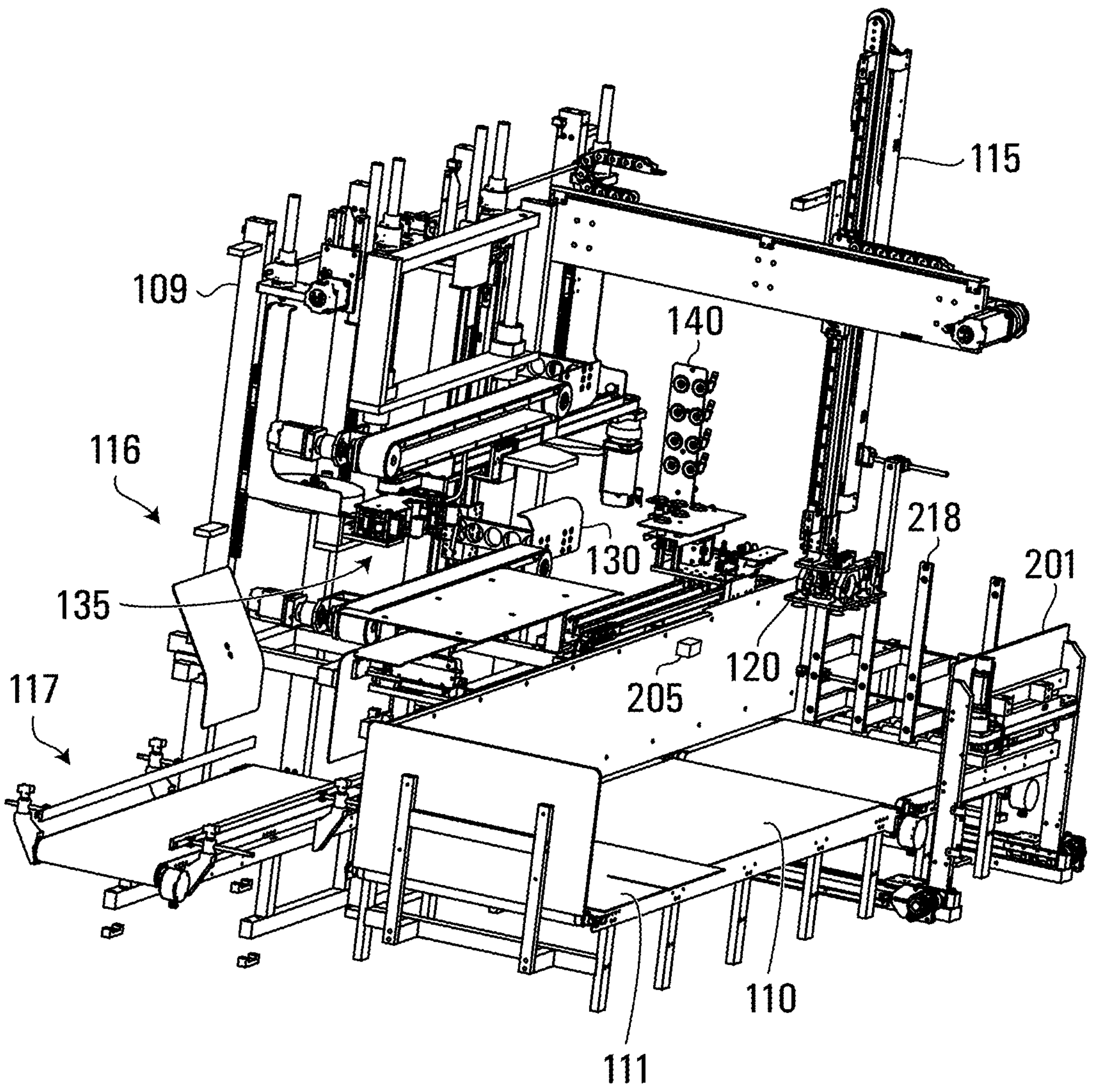

With reference initially to FIGS. 1 and 2, in overview, a carton forming system 100 has a magazine 110 adapted to receive and hold a plurality of knock-down carton blanks 111 and an end effector 120 for retrieving the knock-down carton blanks from a pick-up area and placing them on a shuttle 140. As will be described hereinafter, the end effector 120 and shuttle 140 co-operate to manipulate the knock-down blanks in such a way as to erect them into sleeves.

System 100 may also include a folding apparatus generally designated 130, configured to fold one or more flaps of each sleeve, and a sealing station 135 at which flaps of the cartons are sealed. System 100 may also include a carton re-orienting station 116 and a carton discharge conveyor 117 for receiving and moving cartons away once they have been fully erected.

Figure 3:
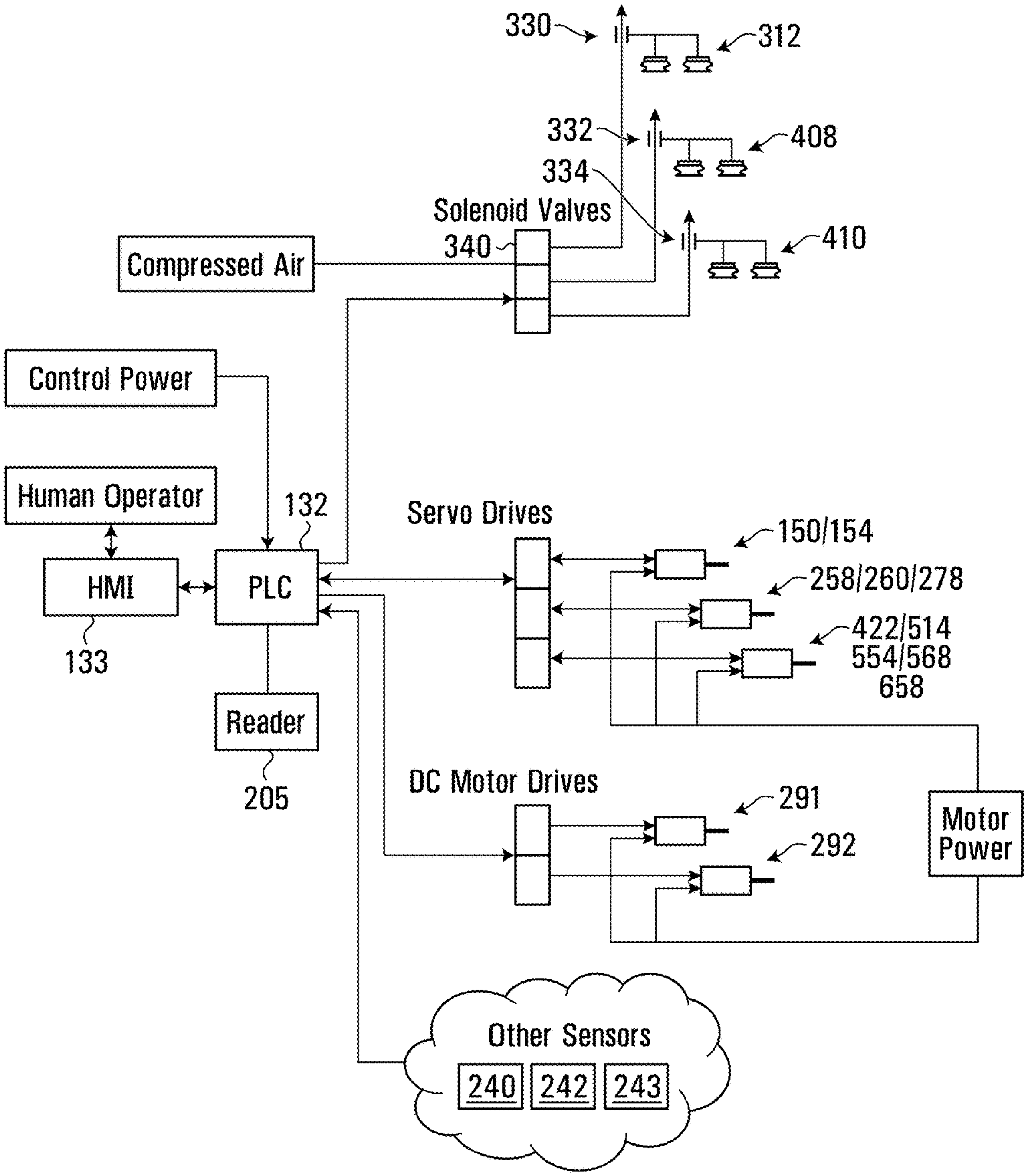
FIG. 3 is a schematic control diagram.

An example of a scheme for the power and data/communication configuration for system 100 is illustrated in FIG. 3. The operation of the components of carton forming system 100, and of system 100 as a whole, may be controlled by a programmable logic controller ("PLC") 132. PLC 132 may be accessed by a human operator through a Human Machine Interface (HMI) module 133 secured to a frame 109 (FIG. 1) of the system. HMI module 133 may be in electronic communication with PLC 132. PLC 132 may be any suitable PLC and may for example include a unit chosen from the Logix 5000 series devices made by Allen-Bradley/Rockwell Automation, such as the ControlLogix 5561 device. HMI module 132 may be a Panelview part number 2711P-T15C4D1 module also made by Allen-Bradley/Rockwell Automation.

Electrical power can be supplied to PLC 132/HMI 133, and to all the various servo motors and DC motors that are described further herein. Compressed/pressurized air can also be supplied to the vacuum generators and pneumatic actuator through valve devices such as solenoid valves that are controlled by PLC 132, all as described further herein. Servo motors may be connected to and in communication with servo drives that are in communication with and controlled by PLC 132. Similarly, DC motors may be connected to DC motor drives that are in communication with and controlled by PLC 132, again all as described further herein. Additionally, various other sensors are in communication with PLC 132 and may (although not shown) also be supplied with electrical power.

Figure 4A:
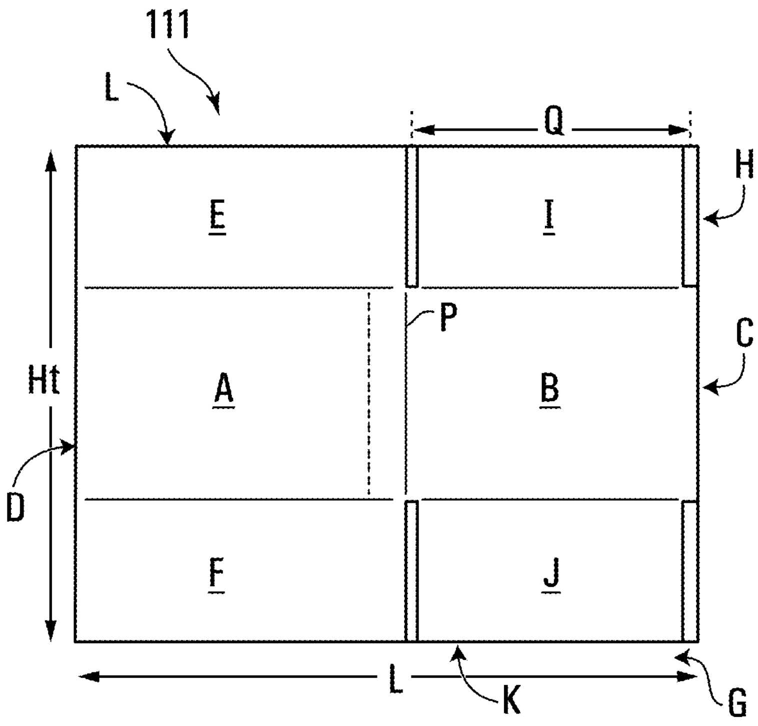
FIG. 4A is a plan view of one side of a knock-down blank that may be processed by the system.
Figure 4B:
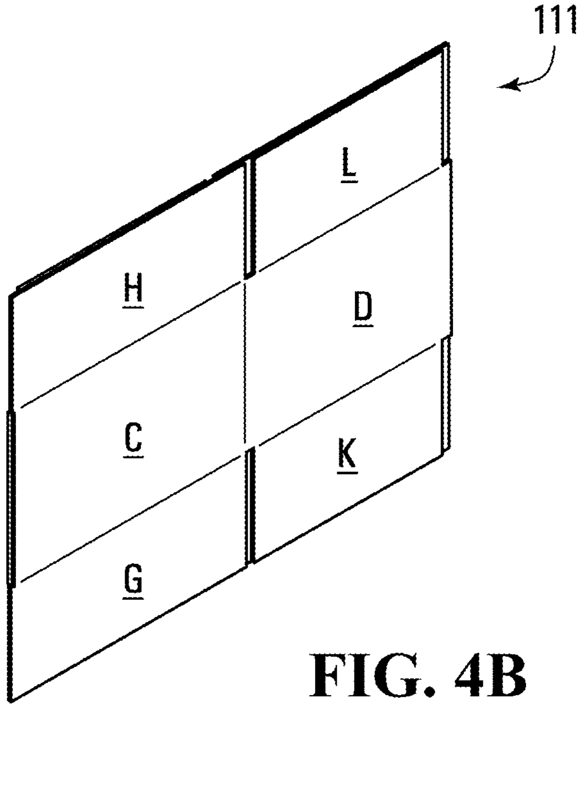
FIG. 4B is a perspective view an opposite side of the knock-down blank of FIG. 4A.
Figure 5:
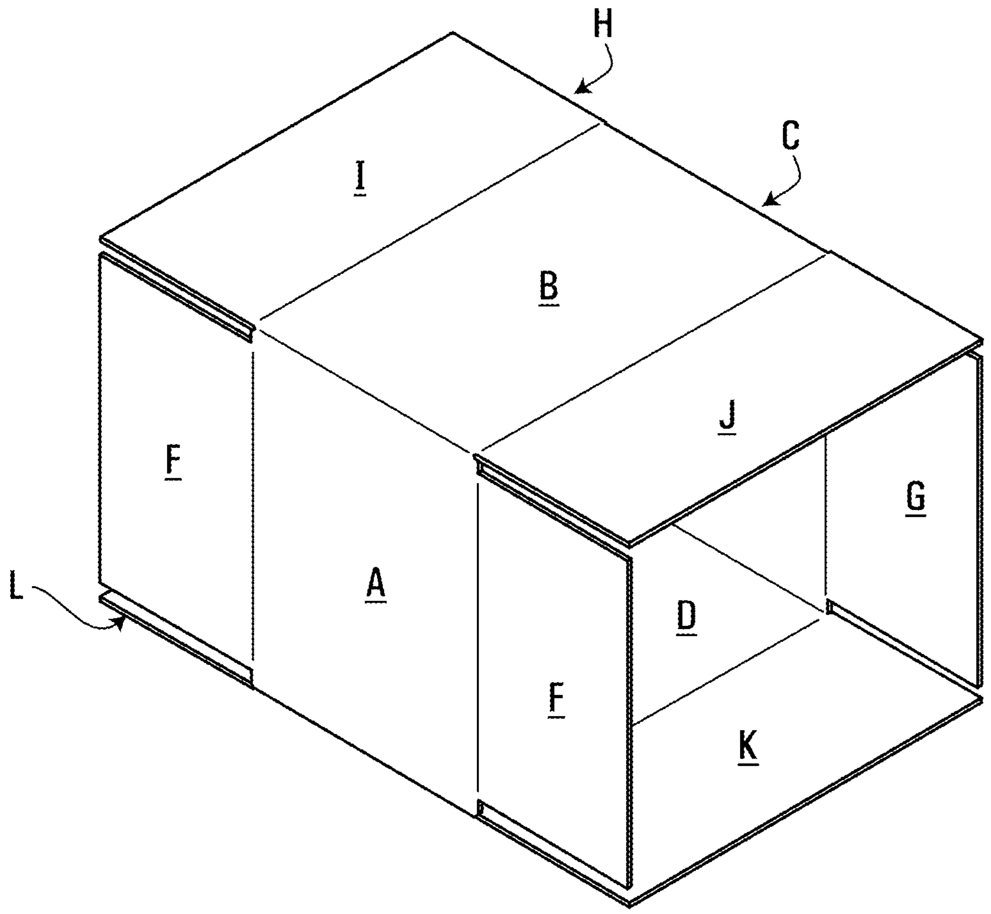
FIG. 5 is a perspective view of a carton erected from the knock-down blank of FIGS. 4A and 4B.

With reference now to FIGS. 4A, 4B, and 5, an example of one kind of knock-down carton blank 111 that can be processed by system 100 to form a regular slotted case (RSC) is disclosed. Other types of knock-down carton blanks, and knock-down carton blanks of different sizes can also be processed by system 100.

Each carton blank 111 may be generally initially formed and provided in a knock-down configuration—i.e., a flattened tubular configuration—as shown in FIGS. 4A and 4B. Each bank 111 has a height dimension "Ht"; a length dimension "L"; and a major panel Length "Q" (see FIG. 4A). By inputting each of these three dimensions for a blank to be processed by system 100 into PLC 132, PLC 132 can determine if the system 100 can process that size blank without the necessity for manual intervention to make an adjustment to one or more components of the system 100. If PLC 132 determines that the adjustment can be made without human intervention, the PLC may make the necessary adjustments to positions and/or movements of at least some of the components forming system 100.

Blank 111 may have opposed major side panels A and C integrally interconnected to a pair of opposed minor side panels B and D to form a sleeve, seen in FIG. 5, when opened. An overlap strip of carton blank material may be provided between panel B and panel A that can be sealed by conventional means such as a suitable adhesive, to provide an overlapping seam joint in the vicinity of "P" (see FIG. 4A). This seam joint at the overlap forms a knock-down carton blank in which the panels A, B, C and D are joined into a continuous blank that is of generally flattened tubular configuration, as shown in FIGS. 4A and 4B.

Also, as shown in FIGS. 4A, 4B and 5, are major and minor end flaps E, H, L, I that are provided at one end of the respective major and minor side panels A-D. A second set of major and minor end flaps F, G, K and J are provided on the opposite, lower/bottom end of the major and minor side panels A-D. However, in other embodiments, cartons having other panel configurations can be formed. The panels and flaps are connected to adjacent flaps and/or panels by predetermined fold/crease lines as shown in FIGS. 4A and 4B. These fold/crease lines may for example be formed by a weakened area of material and/or the formation of a crease with a crease forming apparatus. The effect of the fold lines is such that one panel such as for example panel A can be rotated relative to an adjacent panel such as D or B along the fold lines. Flaps may also fold and rotate about fold lines that connect them to their respective panels.

As will be described hereinafter, carton blank 111 may be transformed from a knock-down blank (i.e., a generally flattened tubular configuration) to an open sleeve (open tubular configuration) and the flaps may be folded and sealed to form the desired erected carton configuration. System 100 is configured to deliver each carton with an upwardly facing opening suitable for top loading. In another embodiment, system 100 may be configured to deliver each carton with a sidewards facing opening suitable for side loading.

Carton blanks 111 may have flaps that provide material that can, in conjunction with a connection mechanism (such as for example with application of an adhesive, sealing tape or a mechanical connection such as is provided in so-called "Klick-Lok™" carton blanks) interconnect flap surfaces, to join or otherwise interconnect, flaps to adjacent flaps (or in some embodiments flaps to panels), to hold the carton in its desired erected configuration.

Carton blanks 111 may be made of any suitable material (s) configured and adapted to permit the required folding/bending/displacement of the material to reach the desired configuration. Examples of suitable materials are chipboard, cardboard or creased corrugated fiber-board. It should be noted that the blank may be formed of a material which itself is rigid or semi-rigid, and not easily foldable but which is divided into separate panels and flaps separated by creases or hinge type mechanisms so that the carton can be erected and formed.

Turning now to the various portions of system 100, with reference to FIGS. 1 to 3, magazine 110 may be configured to hold a plurality of vertically stacked knock-down carton blanks 111, and be operable to move the stack of carton blanks 111 in a horizontal direction generally parallel to horizontal axis X under the control of PLC 132, to a pick-up location where end effector 120 can retrieve cartons from the magazine.

Magazine 110 may comprise a single conveyor or other blank feed apparatus to deliver blanks to a pick-up location. In the illustrated embodiment, two conveyors are disclosed: an infeed conveyor 204 and an alignment conveyor 206. Infeed conveyor 204 may be configured and operable to move a stack of blanks 111 from a stack input position (where a stack may be loaded onto conveyor 204 such as by human or robotic placement) to a position where the stack of blanks is transferred to a horizontally and transversely aligning, alignment conveyor 206. Alignment conveyor 206 may be positioned downstream in relation to infeed conveyor 204 and be used to move the stack of blanks to the pick-up location. Magazine 110 may be loaded with, and initially hold, a large number of carton blanks 111 in vertical stacks, with the stacks resting on infeed conveyer 204. A rear wall 202 mounted to frame 109 is configured to retain a stack from falling backwards when initially loaded on conveyor 204. Rear wall 202 may have a generally planar, vertically and transversely oriented surface facing the stack of blanks 111. Conveyor 204 may be of an appropriate length to be able to store a satisfactory number of stacks of blanks in series on conveyor 204. PLC 132 can control the operation of conveyor 204 to move one stack at a time to the alignment conveyor 206.

With infeed-conveyor having one or more stacks of blanks arranged longitudinally on infeed conveyor 204, the stacks can be fed in turn onto alignment conveyor 206. A sensor (not shown) may be provided in the vicinity of conveyor 204 to monitor whether there is a stack waiting on conveyor 204 and that sensor may be operable to send a warning signal to PLC 132 that can alert an operator that the magazine is low and needs to be replenished. The sensor may be a part number 42GRP-9000-QD made by Allen Bradley.

Of particular note, a plurality of stacks of blanks might be provided on conveyor 204 and each stack may be have associated information that can be read by an information reader 205 such as electronic or an optical reading device. For example, a bar code may be provided on each stack of blanks, such as on the top or bottom blank of the stack. The bar code may be read by a bar code reader associated with the infeed conveyor 204. The bar code reader may be in communication with PLC 132. The bar code may provide information indicative of a characteristic of the blanks in the stack. For example, the bar code may identify the size and/or type of blank in a particular stack. Other information indicators may be used such as for example RFID tags/chips and RFID readers. The information can then be automatically provided by the information reader to PLC 132 which can determine whether the current configuration of system 100 can handle the processing the particular type/size of blanks without having to make manual adjustments to any of the components. It is contemplated that within a certain range of types/sizes of blanks, system 100 is able to handle the processing of different types/sizes of blanks without manual adjustment of any components of system 100. The bar code/RFID tag may provide the information about the dimensions of the blank as discussed above and then PLC 132 can determine adjustments, if any, that need to be made to (a) the components of the magazine; (b) the movement of the end effector 120; (c) the movement of the shuttle 140; and (d) at least some of the components of the folding apparatus 130 and some components at the sealing station 135 to be able to process a particular blank or a particular stack of blanks. The result is that system 100 may be able to automatically process at least some different types of blanks to form different cartons, without having to make manual operator adjustments to any components of system 100.

The belt of infeed conveyor 204 may be driven by a suitable motor such as a DC motor or a variable frequency drive motor 291 (see FIG. 3) controlled through a DC motor drive (all sold by Oriental under model AXH-5100-KC-30) by PLC 132.

Once PLC 132 is given an instruction (such as by a human operator through HMI module 133), infeed conveyor 204 may be activated to move a stack of blanks 111 horizontally downstream. PLC 132 can control motor 291 through the motor drive and thus conveyor 204 can be operated to move and transfer the stack towards and for transfer to the alignment conveyor 206.

Stack alignment conveyer 206 may be driven by a motor 292 (FIG. 3) that may be like motor 291 and with a corresponding motor drive. Motor 292 may also be controlled by PLC 132. Conveyor 206 may be operated to move the stack of blanks 111 further horizontally until the front face of the stack abuts a planar front stop picket wall 218.

The belts of conveyors 204 and 206 may be made from any suitable material such as for example Ropanyl.

A sensor 242 (FIG. 3), such as an electronic eye model 42KL-D1 LB-F4 made by ALLEN BRADLEY, may be located within the horizontal gap between conveyors 204 and 206. Sensor 242 may be positioned and operable to detect the presence of the front edge of a stack of blanks as the stack of blanks begins to move over the gap between conveyors 202 and 206. Upon detecting the front edge, sensor 242 may send a digital signal to PLC 132 (FIG. 3) signalling that a stack has moved to a position where conveyor 206 can start to move. PLC 132 can then cause the motor 292 (FIG. 3) for conveyor 206 to be activated. In this way, there can be a "hand-off" of the stack of blanks from infeed conveyor 204 to alignment conveyor 206.

Once the rear edge of the stack of blanks 111 has passed the sensor 242 a signal may be sent to PLC 132 which can then respond by sending a signal to shut down the motor 291 (FIG. 3) driving conveyor 204. Conveyor 204 is then in a condition ready to be loaded with another stack of blanks 111. Meanwhile conveyor 206 can continue to operate as it moves the stack of blanks 111 to the pick-up location.

The presence of a stack of blanks 111 at the pick-up location may be detected by a sensor 240 (FIG. 3) that may be the same type of sensor as sensor 242. The sensor 240 may detect the presence of the front edge of a stack of blanks at the pick-up location and may send a digital signal to PLC 132 signalling that a stack is at the pick-up location. At the pick-up location, the stack of blanks may be "squared up" and thereafter, once properly aligned, single carton blanks 111 may be retrieved in series from the stack of blanks 111 by engagement of the end effector 120 with the uppermost blank in the stack.

During movement of the stack of blanks 111 horizontally by conveyors 204 and 206, the left hand side of the stack of blanks may be supported and guided by a left hand side wall 200 which is fixed to the frame 190. Side wall 200 may be oriented generally vertically and may extend horizontally for substantially the full lengths of conveyors 204 and 206.

Figure 6:
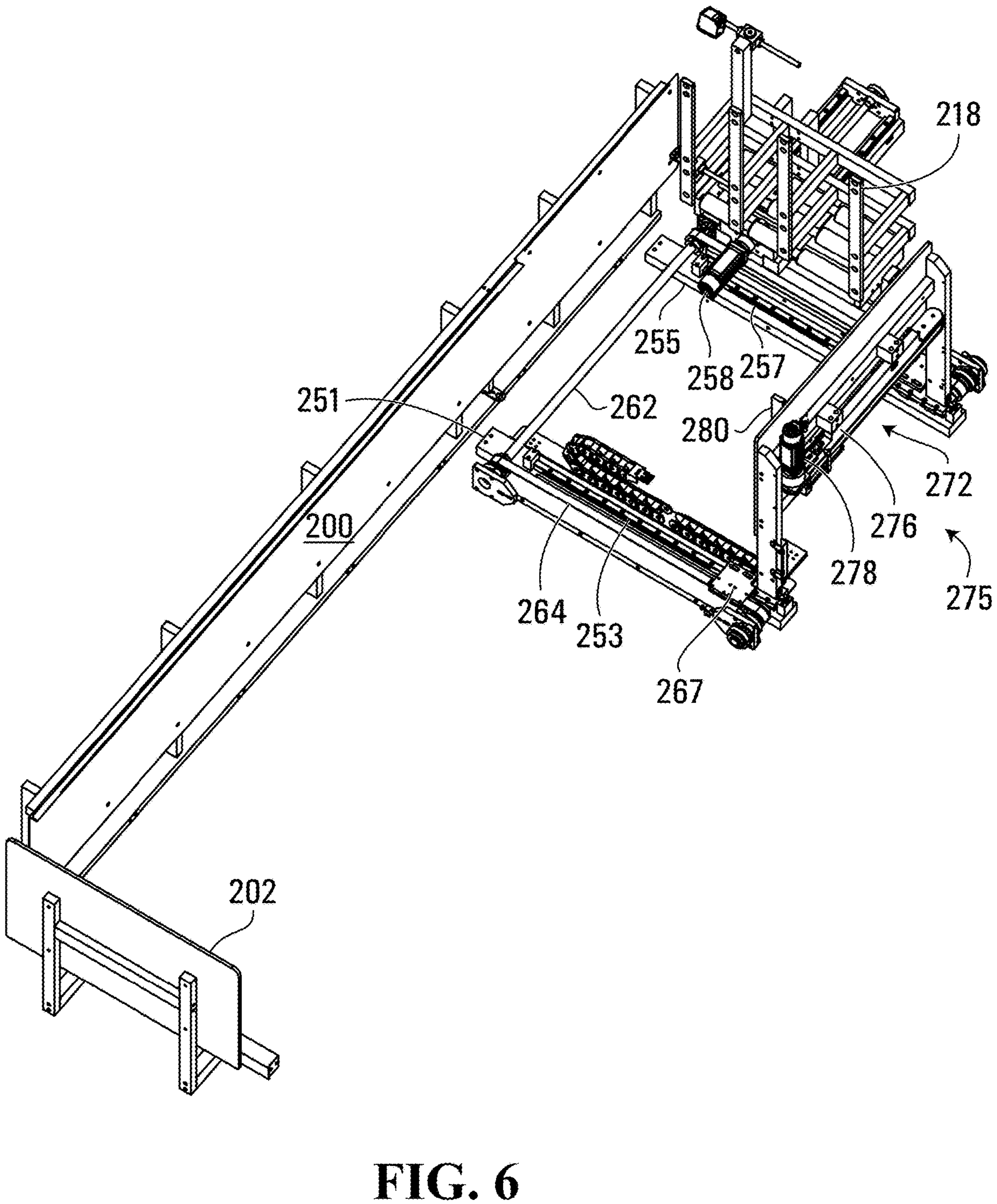
FIG. 6 is a top perspective view of a portion of the system of FIGS. 1 and 2.
Figure 7:
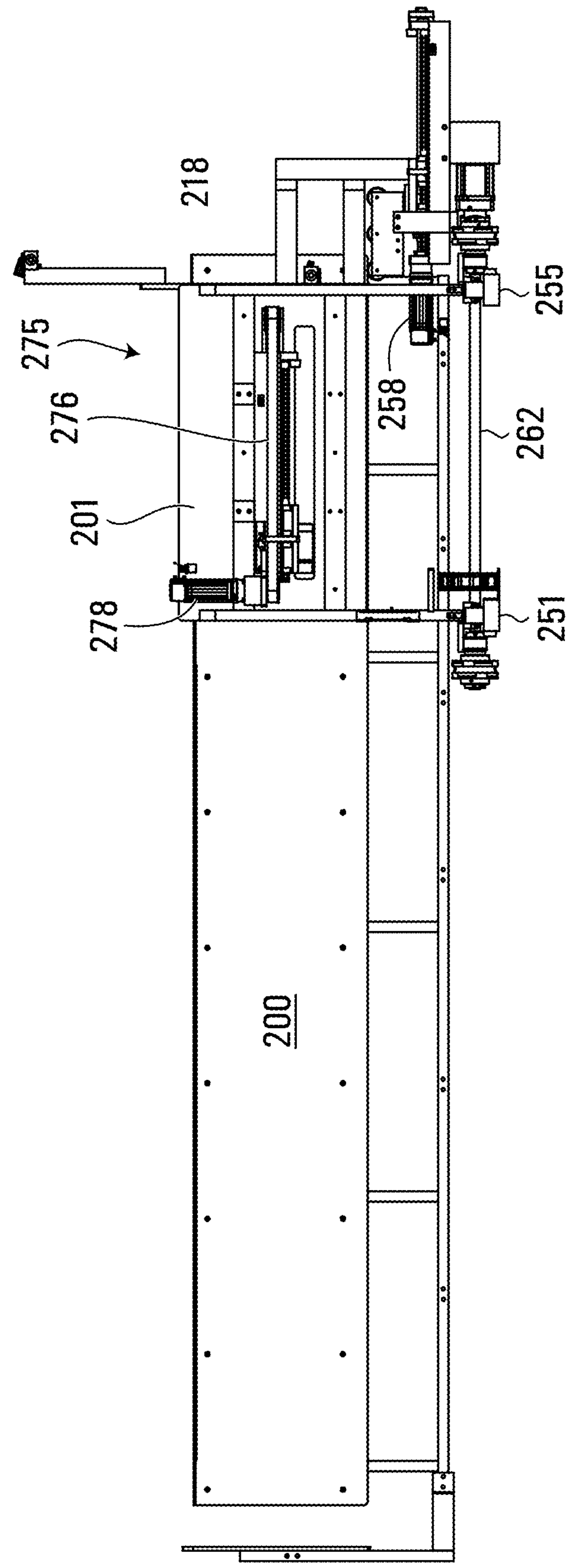
FIG. 7 is a side view of the portion of FIG. 6.

The outer side of the magazine 110 adjacent conveyor 204 may be left open; however the outer side of conveyor 206 has a moveable outer guide wall 201. The mounting arrangement for side wall 201 is illustrated in FIGS. 6 and 7. Turning to these figures, transverse bottom support plates 251 and 255 are supported on the factory floor spaced from, and parallel to, each other. Each of support plates 251, 255 has mounted to a respective upper surface thereof tracks 253, 257. Side wall 201 is supported by connector blocks 267 which are slidably received on tracks 253, 257.

A drive mechanism in electronic communication with PLC 132 may be provided to drive side wall 201 on its tracks. Specifically, a servo motor 258 may be provided and be in electronic communication with PLC 132 through a servo drive (as seen in FIG. 3). Examples that could be used are servo motor MPL-B1530U-VJ42AA made by ALLEN BRADLEY, in combination with servo drive 2094-BC01-MP5-S also made by ALLEN BRADLEY and gear head AE050-010 FOR MPL-A1520 made by Apex. The servo motor 258 may drive a shaft 262 to, in turn, drive an endless belt 264 attached to each of the blocks 267. An encoder may be provided within or in association with servo drive motor 258 and the encoder may rotate in relation to the rotation of the shaft of the servo drive. The encoder may be in communication with, and provide signals to the servo drive which can then pass on the information to PLC 132. Thus, PLC 132 may be able to determine the transverse position of side wall 201 and can operate the servo drive 258 to adjust the position of the side wall 201. The particular type of encoder that may be used is known as an "absolute" encoder. Thus once the encoder is calibrated so that a position of the shaft 262 is "zeroed", then even if power is lost to system 100, the encoder can maintain its zero position calibration.

During operation of system 100, while side wall 200 is fixed, side wall 201 is moved laterally as part of a blank stack alignment procedure to provide for generally longitudinal alignment of the end edges of blanks 111 in the stack being prepared for processing as the stack is held between side walls 200 and 201. Specifically, the PLC positions side wall 201 based on the height dimension Ht (FIG. 4A) of the knock-down blanks in the stack being readied for processing as previously read by information reader 205.

Side wall 201 has a lateral tamping apparatus 275 to tamp the blanks 111 in a direction toward the front picket wall 218 so as to align of the front and rear side edges of the blanks 111 in the stack. Tamping apparatus has a tamping plate 280 that rides in a longitudinal slot 272 in wall 201. The end of tamping plate 280 which extends through the slot to the outside of wall 201 is joined to endless belt 276 that is driven by servo motor 278 under control of the PLC.

Tamping plate 280 that is located transversely inwardly of the inner surface of side wall 201. Movement of endless belt 276 causes tamping plate 280 to engage the rear side edges of the blanks 111 in the stack to be processed with the consequence that, as the front edges of those blanks are pushed up against the inner surface of the front picket wall 218, the front and rear edges of the blanks become laterally aligned. While a servo drive and belt combination is illustrated, other alignment devices, such as a pneumatic actuator with a piston attached to the tamping plate, could be used.

By operation of PLC 132, suitable adjustment of outside wall 201 and tamping plate 280, a stack of blanks 111 can be "squared-up" and precisely located at a pick-up location—that is, held against inside wall 200 and front picket wall 218. Once in the pick-up location, the blanks are in the proper location for being engaged by the end effector 120.

In particular, once the stack of blanks 111 have generally reached the pick-up location, PLC 132 can send a signal to drive mechanism 260 to cause the drive mechanism 260 to cause side wall 201 to move laterally inwards towards the side of stack of blanks 111. PLC 132 will cause the drive mechanism 260 to move a sufficient distance to cause the edges of the blanks 111 to become in contact along their length with inner surface of longitudinally aligned inner surface of side wall 201. However, PLC 132 will not cause side wall 201 to be moved to such an extent that it creates a force on the stack of blanks such that causes the blanks to buckle/be damaged if they are compressed to a significant extent between side walls 200 and 201. PLC 132 determines how much to move side wall 201 towards side wall 200 by virtue of the carton size dimensions that have been input to the PLC, including dimension Ht (see FIG. 4A). The wall 201 can be moved so as to apply a slight compression that can be fine-tuned such as by trial and error for different sized carton blanks. It should be noted that for many sized cartons, the manufacturers comply with industry standard carton sizes.

Once the longitudinal alignment has been effected by movement of side wall 201, PLC 132 can cause actuator 276 to be activated to cause the vertical plate 280 to engage the rear edges of the blanks 111 in the stack. PLC 132 may cause the vertical plate 280 to move a sufficient distance to cause the rear edges of the blanks 111 to come in contact with inner surface of plate 280. However, the vertical plate 280 is not moved to such an extent that it creates a force on the stack of blanks that would cause the blanks to buckle/be damaged if they are compressed too much between plate 280 and front picket wall 218.

Thus, by way of review: The vertical tamping plate 280 can be adjusted by the PLC operating servo drive 278 in the X-direction so that when the vertical tamping plate 280 is retracted it is in the right position to push the blanks up against the front picket wall 218 (without squeezing them).

In review the tamping sequence for ensuring the blanks are properly squared up at the pick-up location steps include the following:

1. The right-hand-side magazine side guide wall 201 under control of PLC 132 expands wide enough to allow the stack of blanks to enter on alignment conveyor 206, and clear tamping plate 280 even if the stack is misaligned and/or the blanks in the stack are not perfectly square with each other and in relation to the X-Y axes.

2. The conveyor 206 advances the stack of blanks 111 towards the front stop picket wall and such that the stack may abut the front stop picket wall 218.

3. The side guide wall 201 may move inwardly to make contact with the side of the case stack and press the side wall 201 against the left hand side guide wall 200. This aligns the cases so the side edges of blanks are aligned with each other and the longitudinal side wall of the walls 200 and 201. This also brings the tamping plate in behind the stack of blanks.

4. The servo drive 278 may be activated to cause the tamping plate 280 to press the stack forward, thereby aligning the blanks in the stack so that their front and rear edges are vertically aligned with each other and with the inner face of the plate 280 and the inside surface of front wall 218.

5. The blanks are then properly positioned so that the end effector can begin picking up blanks from the stack.

In order to pick-up blanks, the end effector may have one or more suction cups providing a suction force to a panel acting generally normal to the surface of the panel that is engaged, as described further below. Other types of suitable engagement devices might be employed.

Figure 8:
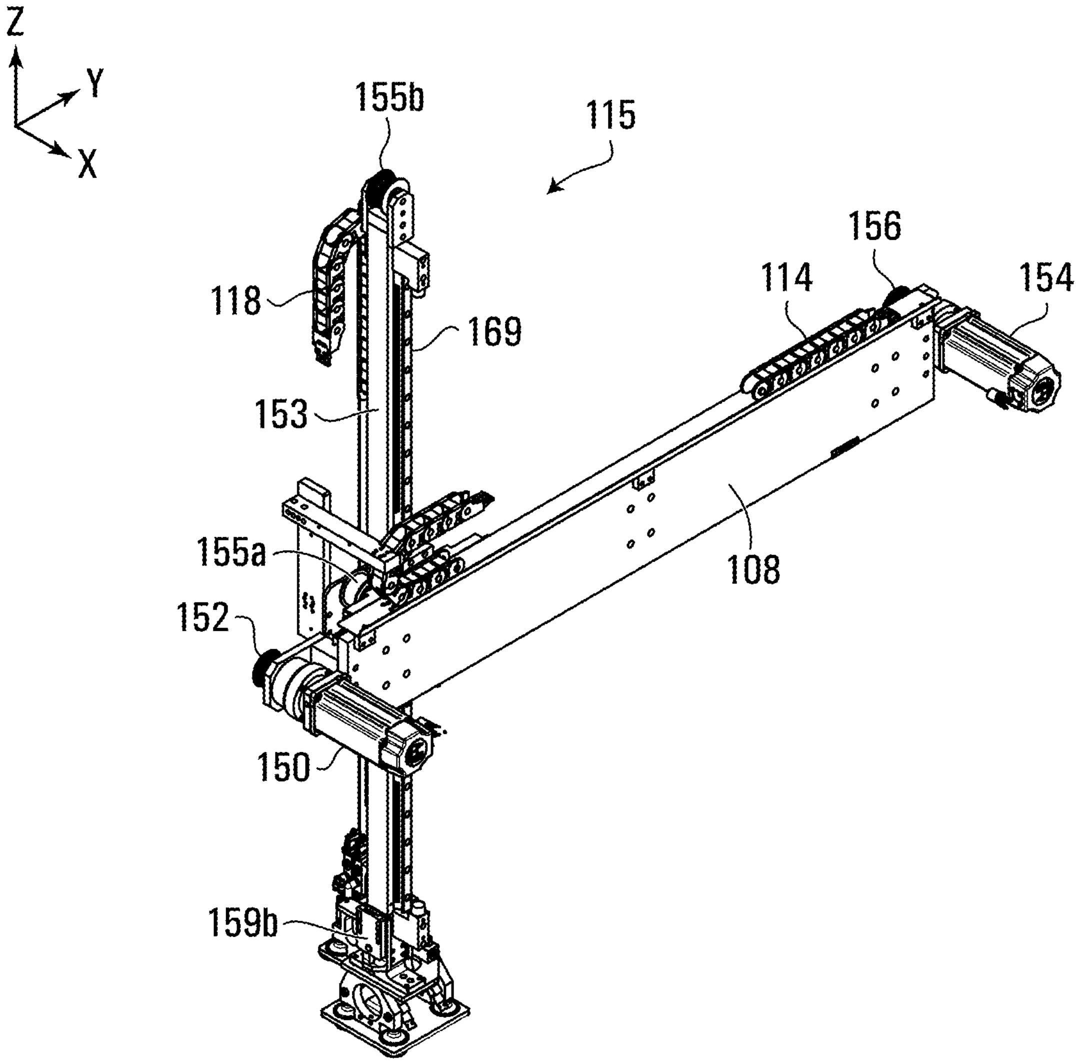
FIG. 8 is a top perspective view of another portion of the system of FIGS. 1 and 2.
Figure 9:
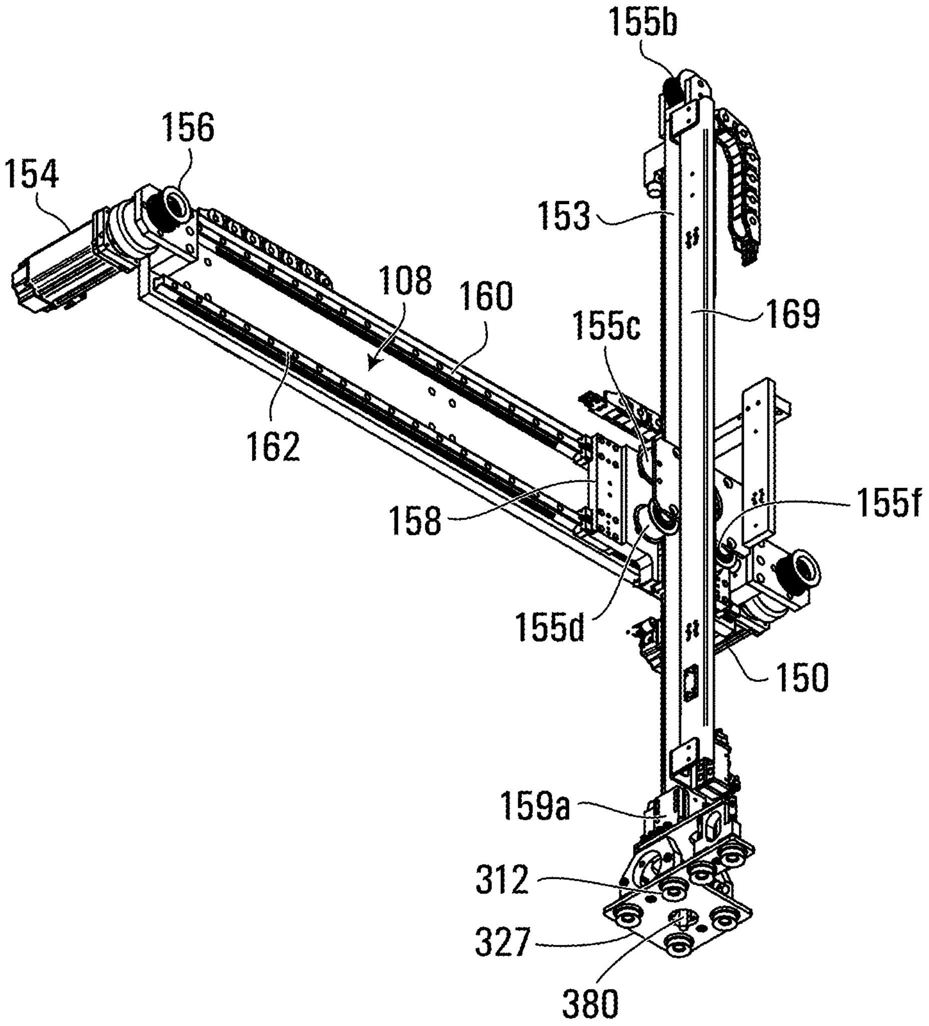
FIG. 9 is a bottom perspective view of the portion of FIG. 8.

Turning to FIGS. 8 and 9, end effector 120 has a dedicated, independently driven and controlled movement apparatus 115 that allows end effector 120 to move in a plane defined by both vertical axis Z and horizontal axis Y in FIG. 8. Thus, movement of the end effector 120 can only be in the vertical Z and horizontal Y directions (i.e. directions parallel to axes Z and Y in FIG. 8)—the end effector cannot move in a horizontal X direction (i.e. a direction parallel to axis X in FIG. 8). If the movement of the end effector 120 is restricted to only Z and Y directions, a moving apparatus can be constructed that is relatively less complex than if movement in all three directions is required.

Movement apparatus 115 includes a vertically oriented support tube 169 that may be generally rectangular in cross section to which end effector 120 is mounted by mounting blocks 190 so that end effector 120 moves in space with support tube 169.

The support tube 169 is slidably mounted to a slide block 158 for vertical movement and slide block 158 is, in turn, mounted to a horizontal rail system for horizontal movement. More specifically, slide block 158 has a pair of spaced, longitudinally and horizontally extending short inner blocks, each one fitting on one longitudinally extending rail 160, 162 that holds the blocks securely but allows blocks to slide horizontally relative to the rails. An example of a suitable rails system is the Bosch Rexroth ball rail system in which the rails are made from steel and the blocks have a race of ceramic balls inside allowing the block to slide on the rails. Rails 160, 162 are generally oriented horizontally are attached to a horizontally extending beam 108 that is connected to frame 109. Slide block 158 may be mounted to rails 160 or 162 for horizontal sliding movement along the rails. Slide block 158 has a rail system to allow support tube 169 to be connected to it so as to be able to move vertically relative to slide block 158. More specifically, a rail extends vertically along a back surface of tube 169 and is interconnected to a runner of slide block 158. Again, a suitable rail system is the Bosch Rexroth ball rail system referenced above. Thus, support tube 169 can slide vertically relative to slide block 158 and will move horizontally with the slide block.

To drive the end effector 120 horizontally and vertically, a drive apparatus is provided which includes a left side drive motor 150 and a right side drive motor 154 (both of which may be servo motors such as the model MPL-B330P-MJ24AA made by Allen Bradley) mounted to either end of beam 108. Servo drive 150 has a drive wheel 152 and servo drive 154 has a drive wheel 156. Both servo motors 150 and 154 can be independently driven in both directions at varying speeds by PLC 132 (FIG. 3) through servo drives. In this regard, both servo motors 150 and 154 may be provided with two separate ports, one for connection to a power line and the other for connection to a communication line to provide communication with the servo drive and PLC 132. Servo motors 150, 154 may also have a third input which may provide input for an electric braking mechanism. It should be noted that all of the servo motors described herein may be similarly equipped.

Four freely rotatable pulley wheels **155*a*, 155*c*, 155*d* and 155*f* are secured to the front face of the slider block 158 and a further freely rotatable pulley wheel 155*b* is attached to the upper end of support tube 169. One end of a drive belt 153—that may for example be made from urethane with steel wires running through it—is fixedly attached to the bottom of support tube 169 by a belt block 159*b*. From there the belt extends upwardly to block pulley 155*f*, around the upper side of block pulley 155*f* and then horizontally to servo drive wheel 152. The belt loops around the servo drive wheel 152 and extends around the underside of pulley 155*a* and then upwards to pulley 155*b*. From there belt extends around pulley 155*b*, downwards to block pulley 155*c*, around block pulley 155*c* and then to servo drive wheel 156. After passing around servo drive wheel 156, belt 153** extends to the upper side of block pulley 155*d*. From block pulley 155*d*, belt 153 then extends vertically downwards to the bottom of the support tube 169 where it attached to the support tube by a belt block 159*a*. With this arrangement, by adjusting the relative rotations of servo drive wheels 152 and 156 through the operation of the servo motors 150 and 154, the vertical position of support tube 169 relative to slide block 158 can be adjusted. Additionally, by adjusting the relative rotations of servo drive wheels 152 and 156, the horizontal position of slide block 158 on rails 160, 162 can be adjusted thus altering the horizontal position of support tube 169 and end effector 120. It will thus be appreciated that by adjusting the direction and speeds of rotation of drive wheels 152, 156 relative to each other the support tube 169 can be moved vertically and/or horizontally in space within the physical constraints imposed by among other things the position of the servo drive wheels 152 and 156, the length of the belt 153, and the length of support tube 169. The following will be appreciated in particular:

- If wheels 152 and 156 both remain stationary then the position of support tube 169 will not be altered;
- If wheels 152 and 156 both rotate in the same clockwise direction and at the same speed relative to each other, then support tube 169 (and thus end effector 120) will move horizontally from right to left;
- If wheels 152 and 156 both rotate in the same counter-clockwise direction and at the same speed relative to each other, then support tube 169 (and thus end effector 120) will move horizontally from left to right;
- If wheel 152 rotates counter-clockwise, and wheel 156 rotates in opposite clockwise rotational directions, but both wheels rotate at the same rotational speed relative to each other, then support tube 169, and thus end effector 120, will move vertically downwardly;
- If wheel 152 rotates clockwise, and wheel 156 rotates in opposite counter-clockwise rotational directions, but both wheels rotate at the same rotational speed relative to each other, then plates 164, 166 will move vertically upwardly.

It will be appreciated that if the speeds and directions of the two servo motors are varied in different manner, then the motion of the support tube 169 (and thus end effector 120) can be created that has both a vertical component as well as a horizontal component. Thus any desired path within these two degrees of freedom (vertical in the Z direction and horizontal in the Y direction) can be created for support tube 169—and thus for the end effector 120 (such as a path having curved path portions). Thus, by controlling the rotational direction and speed of the motors 150, 154 independently of each other, PLC 132 can cause support tube 169 (and thus end effector 120) to move along any path within these two degrees of freedom, within the physical constraints imposed by the spacing of the drive wheels 152, 156 and pulley wheel 155*b*, and the bottom of support tube 169.

An encoder may be provided for each of the servo drive motors 150 and 154 and the encoders may rotate in relation to the rotation of the respective drive wheels 152, 156. The encoders may be in communication with, and provide signals through the servo drives to PLC 132. Thus PLC 132 can in real time know/determine/monitor the position of the belt 153 in space and thus will determine and know the position of the end effector 120 in space at any given time. The particular types of encoders that may be used are known as "absolute" encoders. Thus the system can be zeroed such that due to the calibration of both encoders of both servo drives 150 and 154, the zero-zero position of the end effector in both Z and Y directions is set within PLC 132. The zero-zero position can be set with the end effector at its most horizontally left and vertically raised position. PLC 132 can then substantially in real time, keep track of the position of the end effector 120 as it moves through the processing sequence fora blank 111.

Also associated with moving apparatus 115 is a first, generally horizontally oriented caterpillar device 114 and a second generally vertically oriented caterpillar device 118. Each of the caterpillars 114 and 118 have a hollow cavity housing hoses and wires carrying pressurized air/vacuum and electrical/communication wires. Caterpillar 114 allows such hoses and wires to move longitudinally as the support tube 169 and erector head 120*b* are moved longitudinally. Caterpillar 118 allows such hoses and wires to move vertically as the support tube 169 and erector head 120*b* are moved vertically. The caterpillars allow hoses and wires to supply end effector 120. In this way both pressurized air/vacuum and/or electrical communication wires may be brought form locations external to the frame 109 onto the moving end effector 120. An example of suitable caterpillar devices that could be employed is the E-Chain Cable Carrier System model #240-03-055-0 made by Ignus Inc. It should be noted that electrical communication between the PLC 132 and the end effector 120 could in other embodiments be accomplished using wireless technologies that are commercially available.

End effector 120 has a bottom suction plate 327 with a generally square shape and four peripheral flanged openings, each receiving a suction cup 312. It should be noted that while many types of suction cups may be employed on the end effector, a preferred type of suction cup is the model B40.10.04AB made by Piab. Each suction cup 312 is connected to an outlet from a vacuum generator 330 (FIG. 3). The vacuum generator may be any suitable vacuum generator device such as for example the model VCH12-016C made by Pisco. Vacuum generators each have an inlet interconnected to a hose (not shown) that can carry pressurized air from an air compressor or other vacuum source to the vacuum generator. The vacuum generator converts the pressurized air supplied to the inlet port into a vacuum at one of the outlet ports. That vacuum outlet port is interconnected to a suction cup 312 so that the suction cup can have a vacuum force. A solenoid valve device 340 (FIG. 3) is interposed along the pressurized air channel running between each vacuum generator and the source of pressurized air. The solenoid valve device 340 may for example be a model CPE14-M1BH-5L-⅛ made by Festo. Valve device 340 is in electronic communication with PLC 132 and controlled by PLC 132. In this way PLC 132 can turn on and off the supply of vacuum force to the suction cups 312.

End effector 120 also has a reciprocating sensor rod 380 which, when not in contact with a carton blank, extends downwards through a central aperture in plate 327, below the level of the plane of suction cups 312. When the end effector 120 is brought vertically downwards to retrieve a blank on a stack of blanks 111 in magazine 110, the erector head's movement just prior to suction cups 312 contacting with the upper surface of the blank will be generally vertically downwards. Prior to the suction cups 312 contacting the surface of a top panel of a blank, sensor rod 380 will impact the top panel and cause sensor rod 380, which may be resiliently displaced due to a spring mechanism biasing the rod downwards, to be pushed upwards. This movement upwards of sensor rod 380 relative to plate 327 will cause a sensor (not shown) to be activated and send a signal to PLC 132. The sensor may be an inductive proximity sensor where a metal cylinder fixed on the rod is sensed by the sensor's circuitry due to changes in the inductance of an induction loop inside the sensor. Such a sensor may be an 871FM-D8NP25-P3 sensor made by ALLEN BRADLEY. PLC 132. When the PLC receives a signal from the sensor, it may respond to that signal by causing servo drives 150 and 154 to slow down so that the final few centimeters (e.g. 3.5 cm) of movement downwards towards contact between suction cups 312 and the top panel of the blank occurs at a much slower rate. The sensor also allows the PLC to know how much further vertically downwards end effector 120 must be lowered to establish proper contact between suction cups 312 and the top panel of the carton blank. It should also be noted that sensor rod 380 and its associated sensor device can also be used to ensure that PLC 132 is aware of whether, once a blank has been engaged, it remains engaged with the end effector 120 until it is intentionally released.

Figure 10:
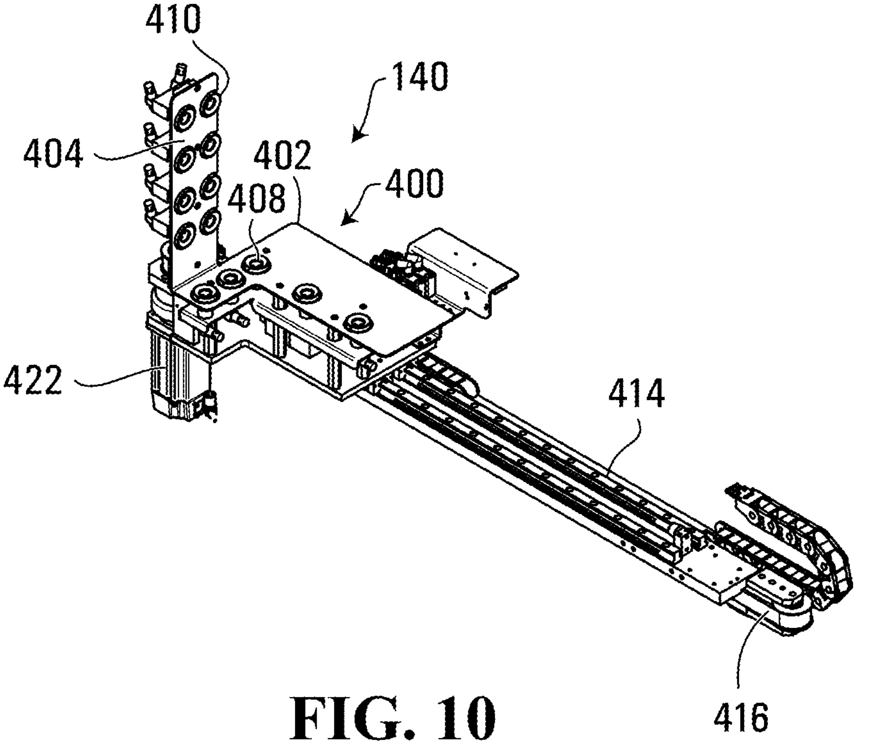
FIG. 10 is a top perspective view of another portion of the system of FIGS. 1 and 2.
Figure 11:
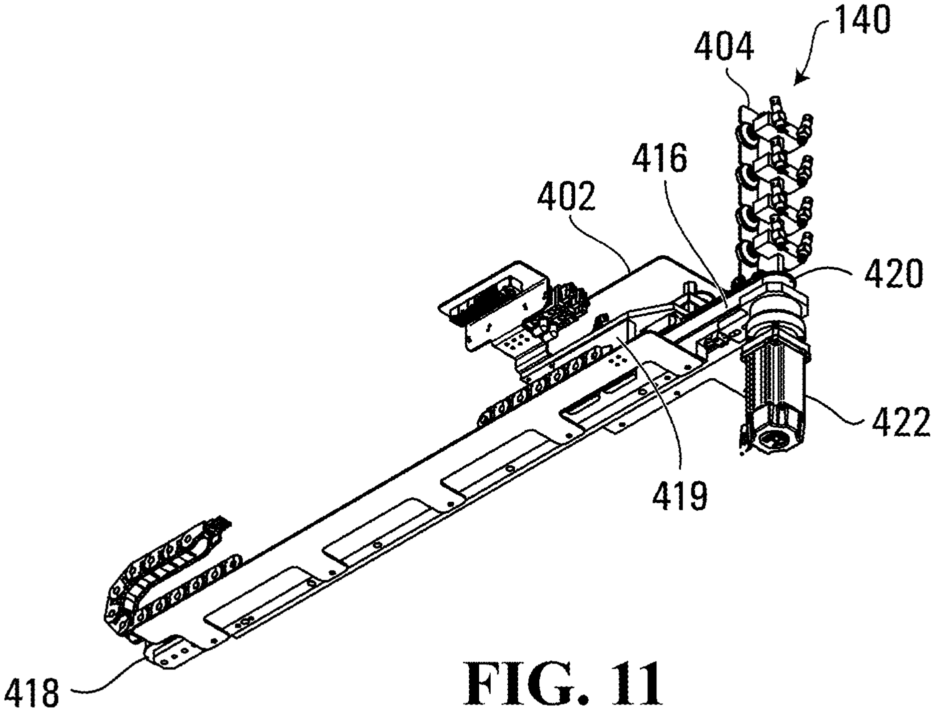
FIG. 11 is a bottom perspective view of the portion of FIG. 10.

Turning to FIGS. 10 and 11, shuttle 140 of system 100 has an L-shaped bed 400 with a horizontally extending base 402 and a vertically extending back wall 404. The base has openings receiving suction cups 408 which are coupled to a solenoid controlled vacuum generator 332 (FIG. 3). Similarly, back wall 404 has openings receiving suction cups 410 coupled to a solenoid controlled vacuum generator 334 (FIG. 3). The shuttle rides on a horizontal rail 414 extending in the X-direction. Rail 414 is supported on the factory floor. The shuttle has a depending belt block 419 attached to an endless drive belt 416. From the belt block, the drive belt extends along rail 414 to free-wheel 418 located at one end of rail 414, around the free-wheel 418 and back along the rail 414 to the its other end where the belt passes around drive wheel 420 of a servo motor 422 and then returns along the rail 414 again to the belt block 419. Given this arrangement, operating the servo motor in a counter-clockwise direction will move the shuttle in a downstream direction (toward the free-wheel 418) and operating the servo motor in a clockwise direction will move the shuttle in an upstream direction (toward servo motor 422).

Figure 12:
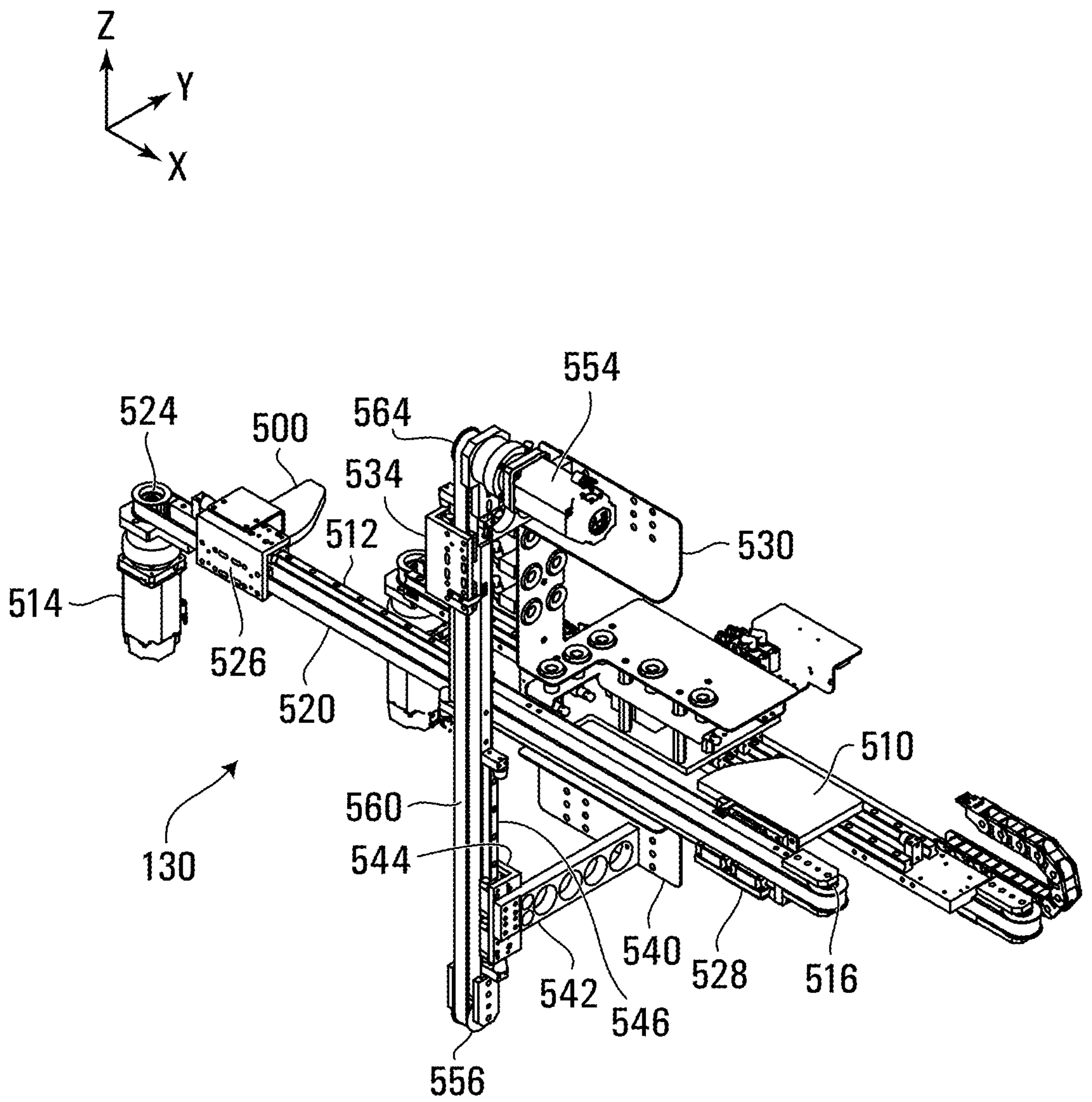
FIG. 12 is a top perspective view of another portion of the system of FIGS. 1 and 2.
Figure 13:
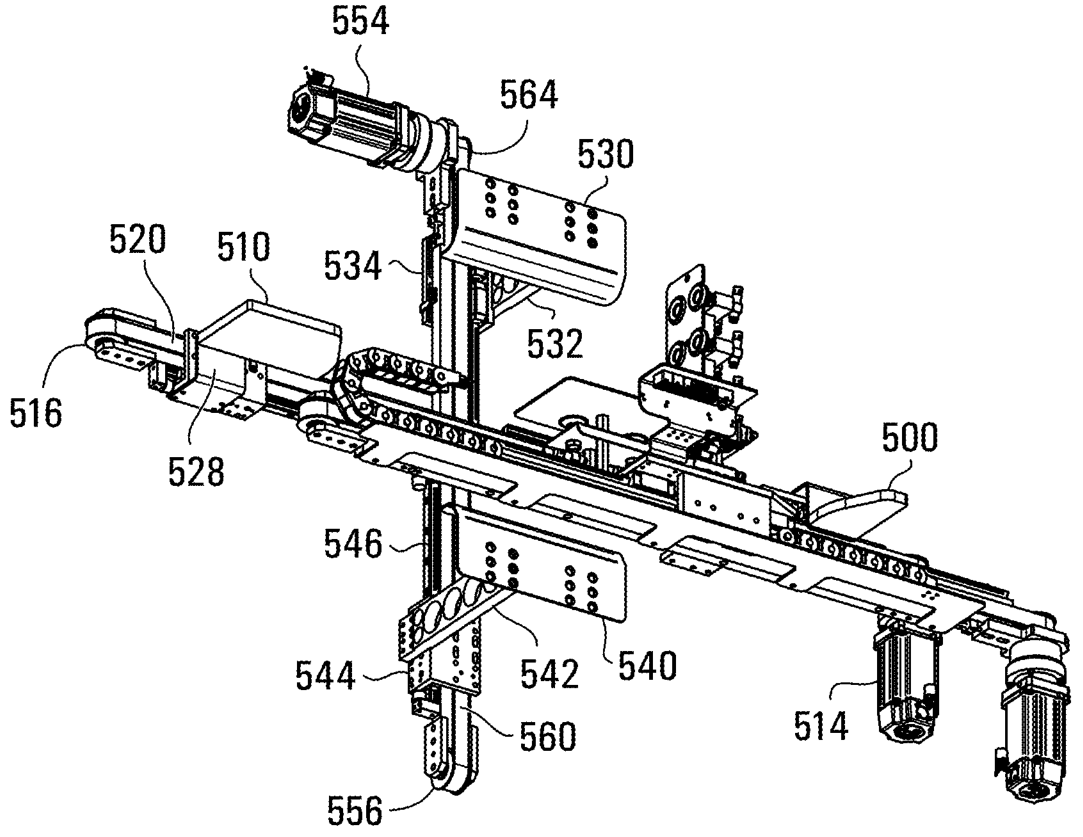
FIG. 13 is a bottom perspective view of the portion of FIG. 12.

FIGS. 12 and 13 detail folding apparatus 130. Turning to these figures, the folding apparatus has opposed horizontally reciprocating fin ploughs, namely an upstream fin plough 500 and a downstream fin plough 510. These fins are slidably supported on a horizontal rail 512 that extends in the X-direction. A servo motor 514 is attached to the upstream end of rail 512 and a free-wheel 516 is attached to the downstream end of the rail. A continuous drive belt 520 runs around the drive wheel 524 of servo motor 514 and the free-wheel 516. Upstream fin 500 has a back plate 526 which is attached to the drive belt and downstream fin 510 has a front plate 528 attached to the drive belt. With this arrangement, if the servo motor 514 is operated in a counter-clockwise direction, fins 500, 510 move toward each other and when servo motor is operated in a clockwise direction, fins 500, 510 move away from each other. The folding apparatus also has opposed vertically reciprocating folding ploughs, namely an upper plough 530 and a lower plough 540. Each folding plough has a planar base terminating in a curved ploughing face. The ploughs 530, 540 are mounted to the ends of respective support arms 532, 542 and the arms are mounted to carriages 534, 544 slidably supported on a vertical rail 546 (i.e., a rail extending in the Z-direction). A servo motor 554 is attached to the upper end of vertical rail 546 and a free-wheel 556 is attached to the lower end of the rail. A continuous drive belt 560 runs around the drive wheel 564 of the servo motor 554 and the free-wheel 556. A back of the upper carriage 534 is attached to belt 560 and a front of lower carriage 544 is attached to the belt. With this arrangement, if the servo motor 554 is operated in a counter-clockwise direction, folding ploughs 530, 540 move toward each other and if the servo motor is operated in a clockwise direction, folding ploughs 530, 540 move away from each other.

Figure 15:
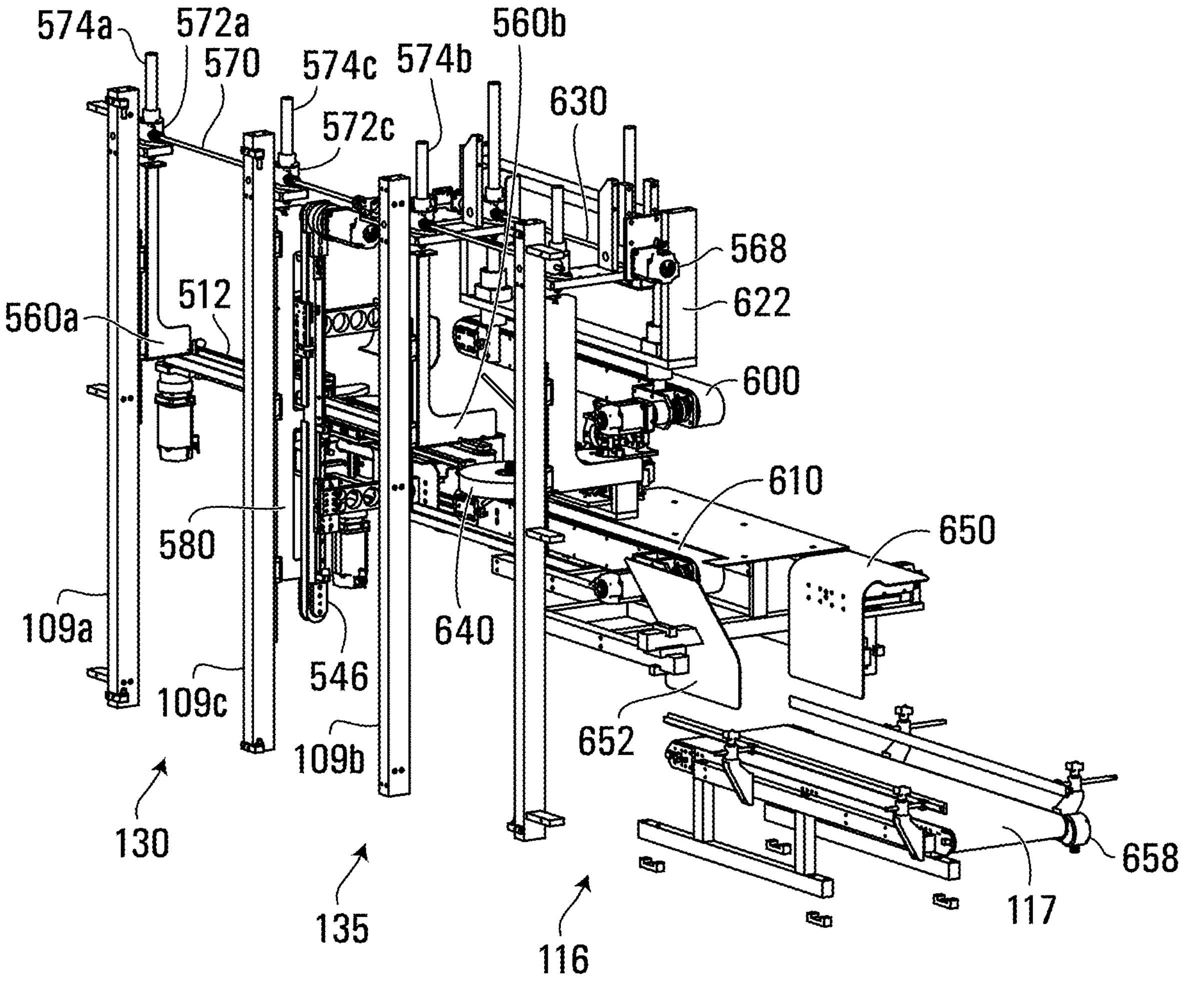
FIG. 15 is a bottom perspective view of the portion of FIG. 14.

Referencing FIGS. 1 and 15 along with FIGS. 12 and 13, the horizontal rail 512 on which fins 500, 510 run is attached at either end to the base of L-shaped supports 560*a*, 560*b*. The L-shaped supports ride in channels 562 of vertical ribs 109*a*, 109*b* of frame 109. A servo motor 568 is geared to a common drive shaft 570 to turn pinions (not shown) inside hubs 572*a*, 572*b*. The pinions mesh with ring gear portions of shafts 574*a*, 574*b* in order to turn, and thereby adjust, the vertical position of the shafts. The shafts are rotatably connected to the top of L-shaped supports 560*a*, 560*b*. The result is that operation of the servo motor 568 in one rotational direction raises the L-shaped supports 560*a*, 560*b*—and therefore fins 500, 510—and operation of the servo motor 568 in the opposite rotational direction lowers the L-shaped supports 560*a*, 560*b*.

Similarly, vertical rail 546 on which folding ploughs 530, 540 run via support arms 532, 542 and carriages 534, 544 is attached to a linear support 580 that rides in a channel of vertical rib 109*c* of frame 109. Common drive shaft 570 also turns a pinion (not shown) inside hub 572*c* and this pinion meshes with a ring gear portion of shaft 574*c* in order to turn, and thereby adjust, the vertical position of shaft 574*c*. The shaft is rotatably connected to the top of linear support 580. The result is that operation of the servo motor 568 in one rotational direction raises the linear support 580—and therefore folding ploughs 530, 540—and operation of the servo motor 568 in the opposite rotational direction lowers the linear support 580. Moreover, since all of supports 560*a*, 560*b*, and 580 are adjusted by common drive shaft 570, these supports are all adjusted to the same vertical extent by operation of servo motor 568.

Figure 14:
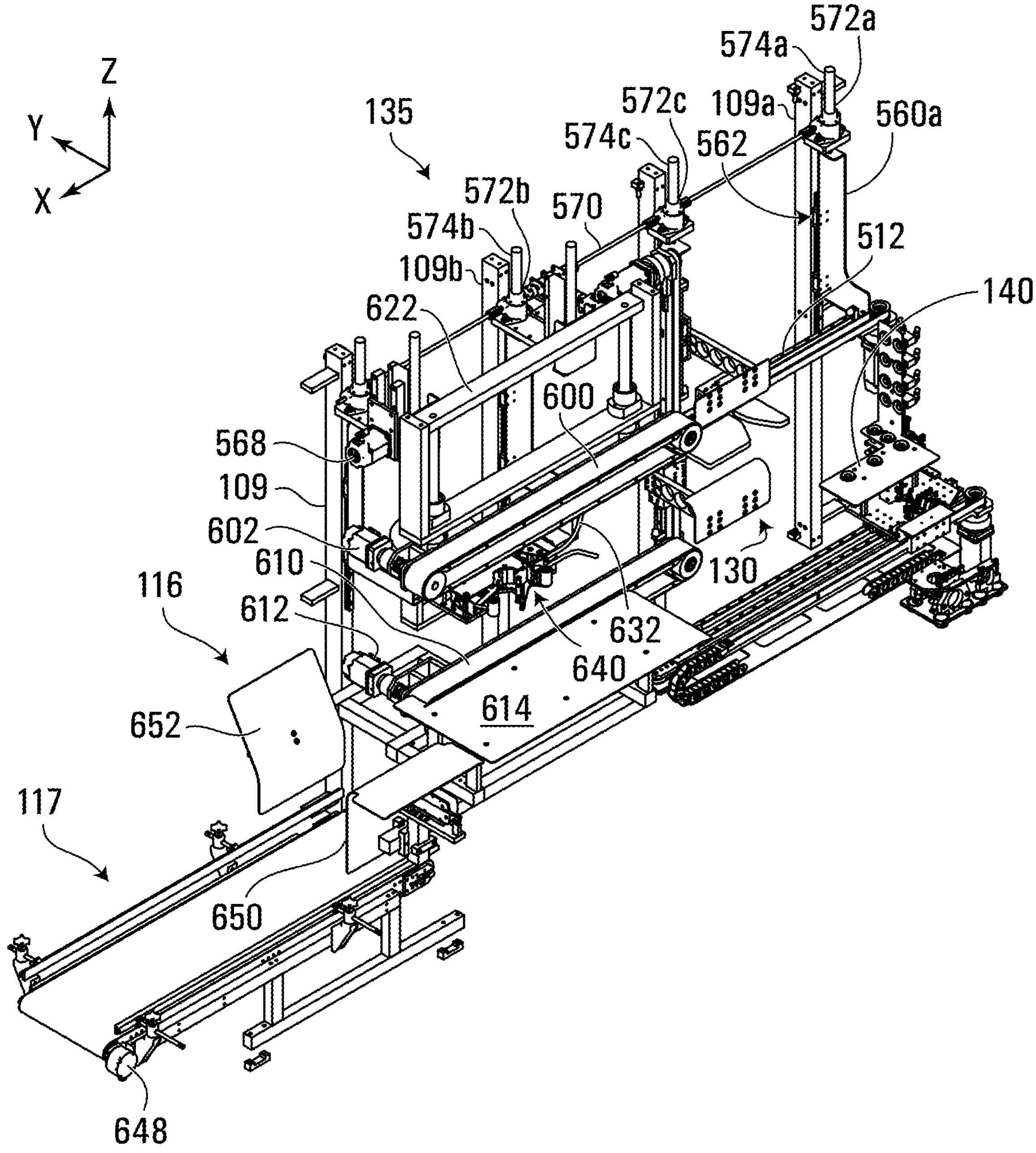
FIG. 14 is a top perspective view of another portion of the system of FIGS. 1 and 2.

Referring to FIGS. 1, 14, and 15 the sealing station 135 has a tape sealer 640 and flap folding rods 632 which are supported by fin supporting rail 512 and so move vertically with fins 500, 510. The sealing station also has a pair of opposed conveyor belts, upper conveyor belt 600 driven by servo motor 602 and lower conveyor belt 610 driven by servo motor 612, with the tape sealer 640 disposed between the conveyor belts 600, 610. The lower conveyor belt 610 and a supporting platform 614 are supported by the factory floor. The upper conveyor belt is mounted to a sub-frame 622. Servo motor 568 has a second drive shaft 630 that is operatively associated with a drive train (not shown) so that operation of the servo motor 568 adjusts the vertical position of sub-frame 622 and, therefore, the upper conveyor belt 600 with respect to the lower conveyor belt 610. Moreover, it will be noted that drive shaft 630 and common drive shaft 570 are driven by the same servo motor, motor 568, such that a vertical adjustment of upper conveyor belt 600 is mirrored by a vertical adjustment of fins 500, 510 and ploughs 530, 540. However, the drive train is configured with a 2:1 drive ratio so that the drive shaft 630 rotates twice for any rotation of common drive shaft 570. The result is that a vertical adjustment of n cm of the fins, folding ploughs, tape sealer and flap supporting rods results in a vertical adjustment of 2*n* cm of the upper conveyor belt 610. This ensures that the centreline of a carton sleeve remains at the level of the fins and tape sealer for any position of the upper conveyor belt 600.

The sealing station terminates at carton re-orienting station 116. The carton re-orienting station has a pair of deflection plates 650, 652 which re-orient a carton as it falls off the end of the sealing station to the discharge conveyor 117 from a position lying on its side at the sealing station 135 to an upright position on the discharge conveyor with its open top facing upwardly. The discharge conveyor 117 is a simple endless belt conveyor driven by a servo motor 658.

A sensor 243 (FIG. 3) such as an electronic eye model 42KL-P2LB-F4 made by ALLEN BRADLEY may be located at the input of the discharge conveyor. Sensor 243 may be positioned and operable to detect the presence or absence of an erected carton at the input to the discharge conveyor 117. In this way, PLC 132 can be digitally signalled if an erected carton blank 111 remains at the input of the discharge conveyor such that another erected carton cannot be discharged. If so, the system 100 can be stopped by PLC 132 until any fault at discharge conveyor 117 can be rectified.

Figure 16:
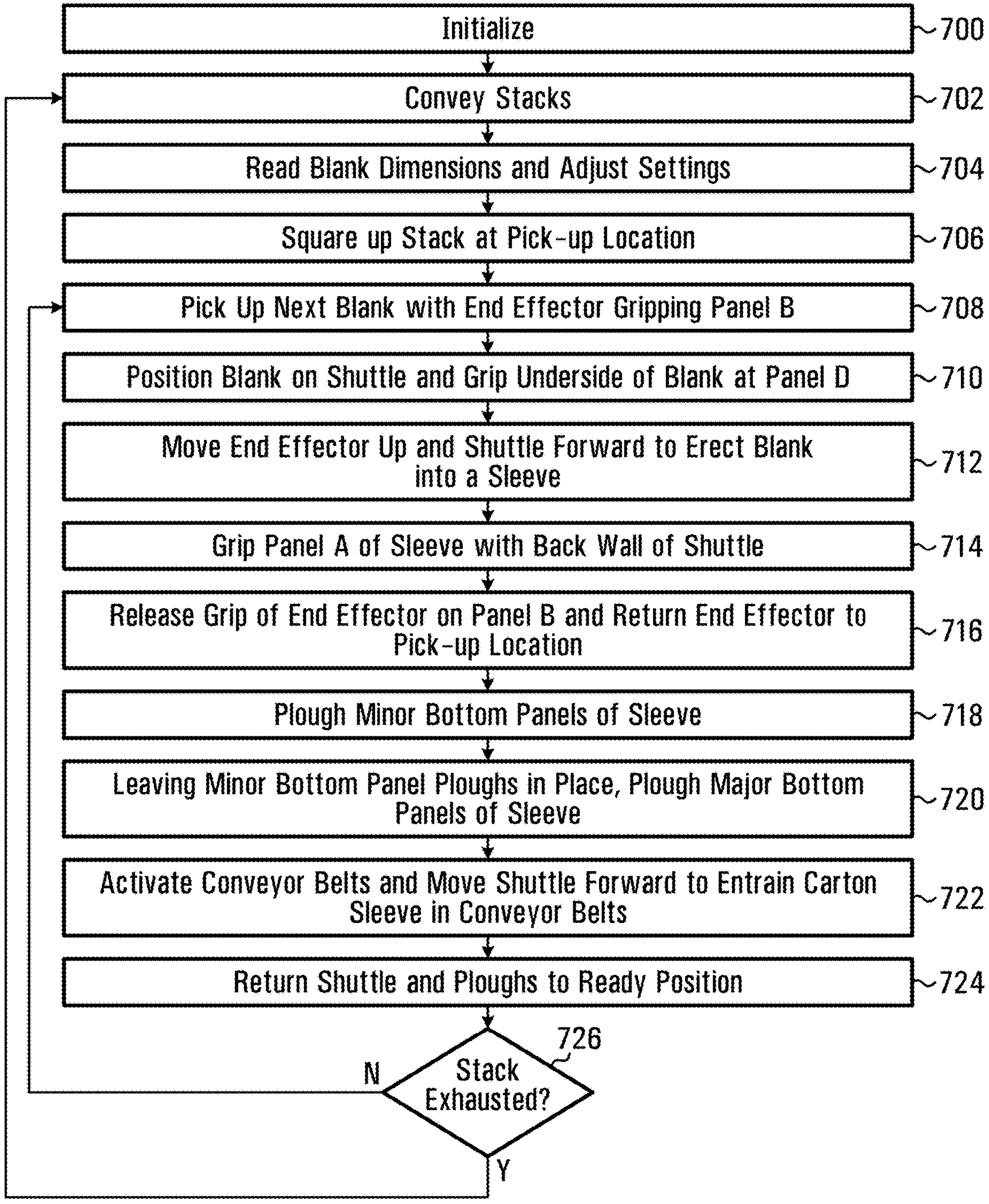
FIG. 16 is a flow diagram illustrating operation of a controller of the system of FIG. 1.

The overall operation of system 100 will now be described further in conjunction with FIG. 16, which is a flow diagram of the sequence of operations of the PLC.

To prepare system 100 for operation, one or more stacks of knock-down carton blanks 111 may be placed at the input end of conveyor 204. In this regard, it is assumed the blanks are placed on the conveyor 204 with panels A and B, and flaps E, F, I, and J facing up, as shown in FIG. 4A, and the common edge of end flaps F and J facing side wall 200 as shown by the blank 111 in FIG. 1. System 100 may then be activated, such as by PLC 132 being instructed through HMI 133 to commence the processing of blanks 111. As an initial step PLC 132 may initialize the system by ensuring that all components are put in their "start" positions (step 700). PLC 132 may then send an instruction to the drive motor of input conveyor 204 causing stack(s) of blanks 111 to be conveyed downstream in the X-direction (step 702) toward an identification reader. An identifier on the first stack may then be read by the identification reader 205 which identifies the dimensions of the blanks in the first stack. With this information and in order to adapt system 100 to process blanks of the size in the first stack, the PLC adjusts the stroke of both the outer side wall 201 and the shuttle 140, the path of end effector 120, the vertical position of the folding fins 500, 510, the folding ploughs 530, 540, the tape sealer 640 and flap folding rods 632, and upper conveyor 600 (step 704).

Sometime prior to a stack of blanks reaching alignment conveyor 206, the outer side guide wall 201 under control of PLC 132 will be driven by servo motor 260 to expand wide enough to allow the stack of blanks to enter alignment conveyor 206, even if the stack is misaligned and/or the blanks in the stack are not perfectly square with each other. The stack(s) of blanks moves downstream, until the front edge of the (first) stack of blanks passes the downstream edge of conveyor 204 at which time sensor 242 sends a signal to PLC 132 indicating that the front edge of the stack has reached the input to alignment conveyor 206. In response, PLC 132 may stop input conveyor 204 and send an instruction to the drive motor of alignment conveyor 206 to cause the stack of blanks 111 to move downstream towards end picket wall 218 of magazine 110. Once the front edge of the stack of blanks 111 reaches end wall 218, sensor 240 will send a signal to PLC 132 indicating that the front edge of the stack of blanks has reached end wall 218. In response, PLC 132 can then move the outer side wall 201 inwardly to straighten the stack laterally and initiate the tamping sequence to "square up" the stack of blanks longitudinally, as detailed above (step 706).

In review, the sequence for ensuring the blanks are properly squared up at the pick-up location may include the following steps. The side guide wall 201 moves inwardly to make contact with the side of the stack of blanks and press the stack against the left hand side guide wall 200. This aligns the blanks so the lateral edges of the blanks are aligned with each other. This also moves the tamping plate 280 in behind the stack. The tamping plate 280 may then move forwardly to press the stack forward against the picket wall 218, thereby aligning the blanks in the stack longitudinally so that their front and rear edges are vertically aligned with each other. The stack of blanks 111 is then properly positioned at the pick-up location so that the end effector 120 can begin picking up blanks from the stack.

End effector 120 will be positioned by the control of PLC 132 over movement apparatus 115, at the zero position calibrated for the end effector 120. PLC 132 may then cause servo motors 150 and 154 to be operated to achieve the following sequence of operations.

First the end effector 120 may be moved to the pick-up location as shown in FIG. 1 such that the end effector is directly over panel B of the top blank in the stack of blanks at the pick-up location.

As the end effector 120 is brought vertically downwards to retrieve the top blank on the stack of blanks 111 in magazine 110, the end effector's movement just prior to suction cups 312 contacting with the upper surface of the blank will be generally vertically downwards. Prior to the suction cups 312 contacting the surface of a panel B of a blank, sensor rod 380 will contact the surface of panel B and be pushed upwardly. This upward movement of sensor rod 380 relative to plate 327 will cause a sensor to be activated and send a signal to PLC 132. PLC 132 responds to that signal by causing servo drives 150 and 154 to slow down so that the final few centimeters (e.g. 3.5 cm) of movement downwards towards contact between cups 312 and the upper surface of panel B occurs at a much slower rate. Also, PLC knows how much further vertically downwards the end effector 120 must be lowered to establish proper contact between suction cups 312 and panel B. PLC 132 will then operate the valve device 330 on end effector 120 to cause suction force to be developed at suction cups 312. Sensor rod 380 and its associated sensor device can also be used to ensure that PLC 132 is aware of whether, once a blank has been engaged in the magazine 110, it remains engaged with end effector 120 until it is intentionally released.

With the end effector 120 in the pick-up location and the suction force being applied at suction cups 312, the end effector 120 engages panel B of the top blank and then lifts the blank lift upwards (step 708).

When the end effector 120 has reached a determined height it is moved laterally in the Y-direction until it is positioned over shuttle 140.

Figure 17:
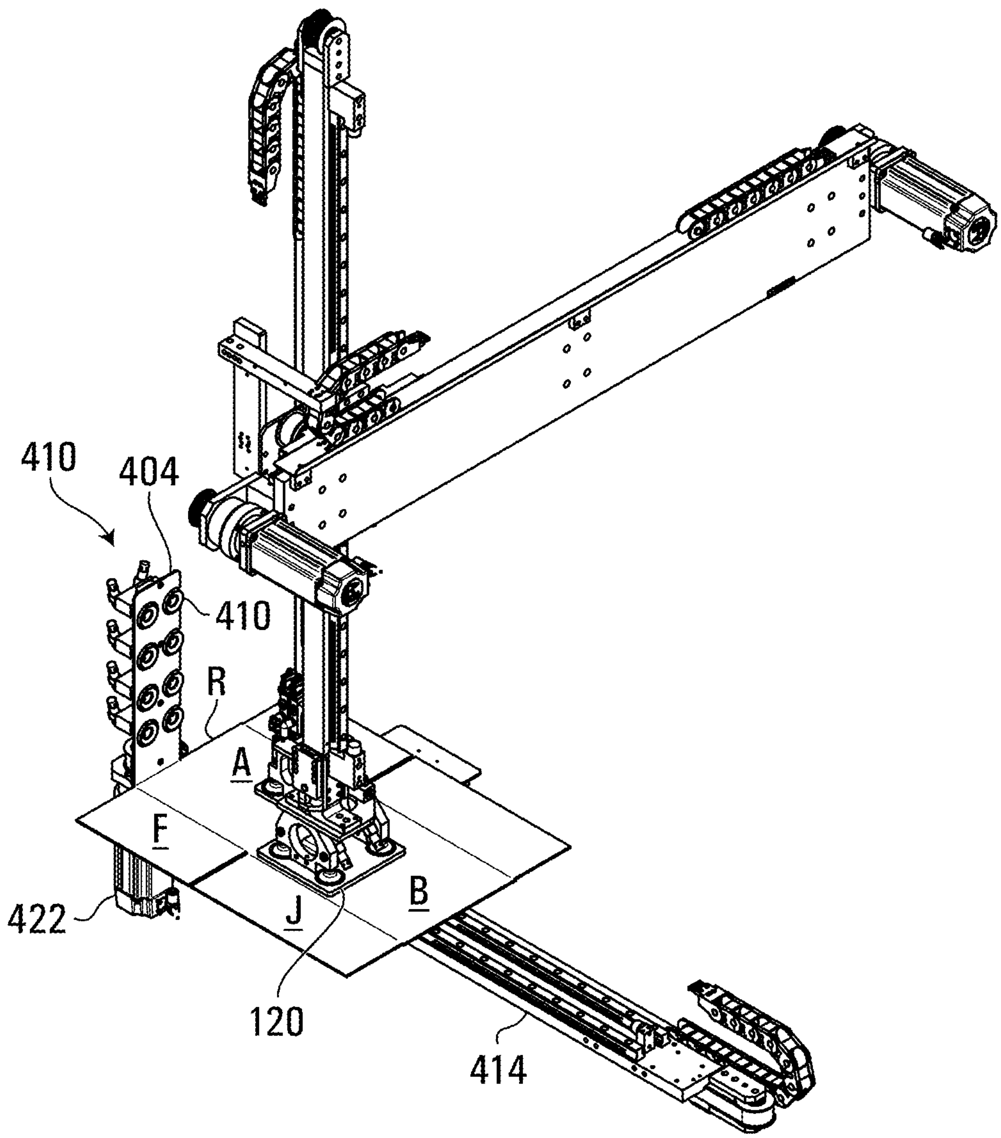
FIGS. 17 to 20 and 22 are top perspective views of a portion of the system of FIGS. 1 and 2 illustrating erection of a knock-down blank into a carton.

Next, with reference to FIG. 17, the end effector descends until the blank sits on the bed 400 of the shuttle with the hinge line R between side panel A and side panel D (FIG. 4B) positioned against the vertically extending back wall 404 of the shuttle 140. The PLC then activates the suction cups 408 at the base 402 of the shuttle bed to grip the underside of the blank, and specifically side panel D of the blank (step 710). Notably, side panel D, being the panel directly underneath side panel A in the knock-down blank, is not directly hinged to panel B, which panel is gripped by the end effector.

Figure 18:
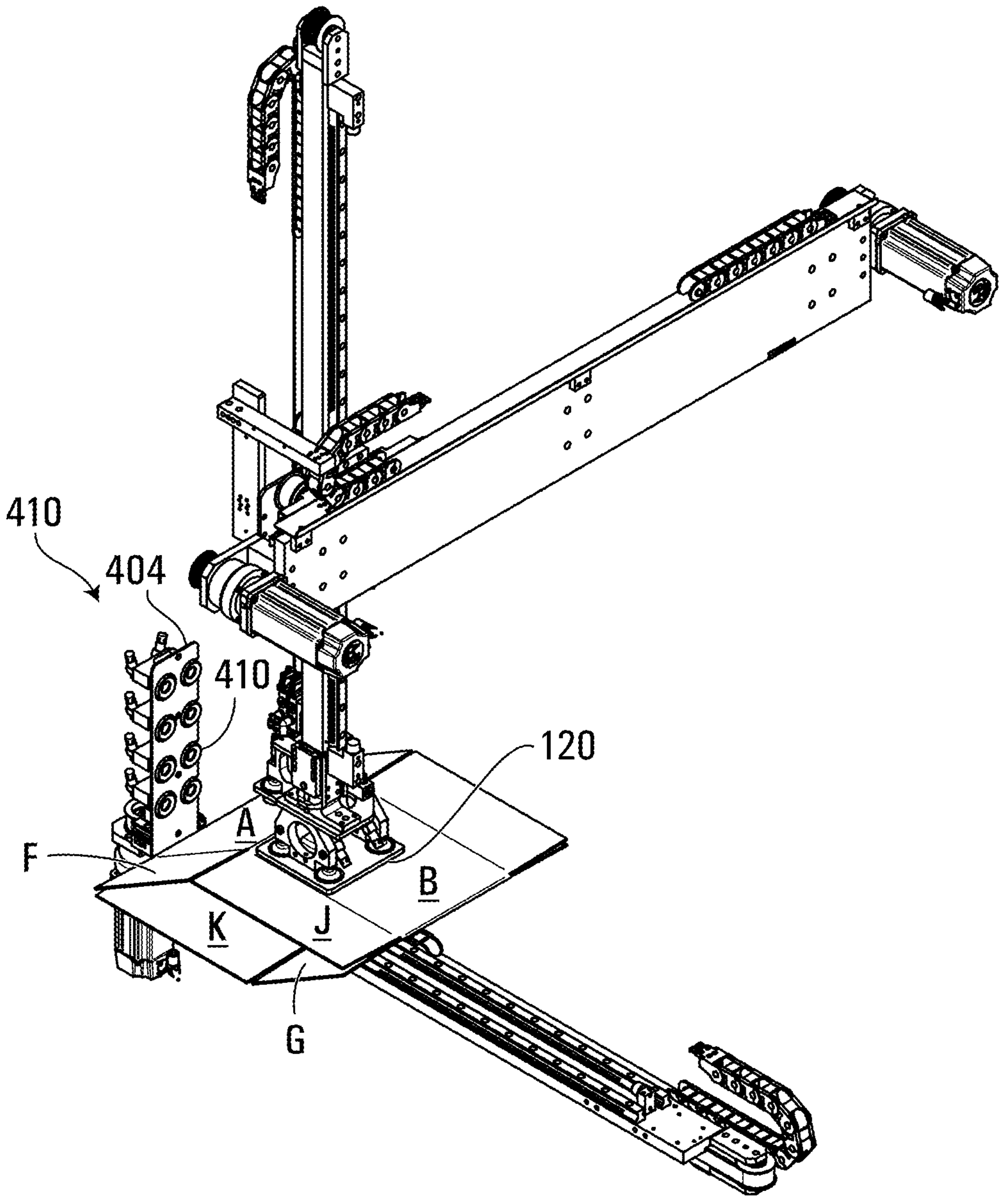

The end effector 120 is then raised vertically in the Z-direction while, simultaneously, the shuttle 140 is moved forwardly in the X-direction. In consequence of these operations, provided the simultaneous motions of the end effector and shuttle are appropriately co-ordinated, since underside panel D of the blank is gripped at the base of the shuttle and top panel B of the blank is gripped by the end effector, the blank begins to open up as illustrated in FIG. 18.

Figure 19:
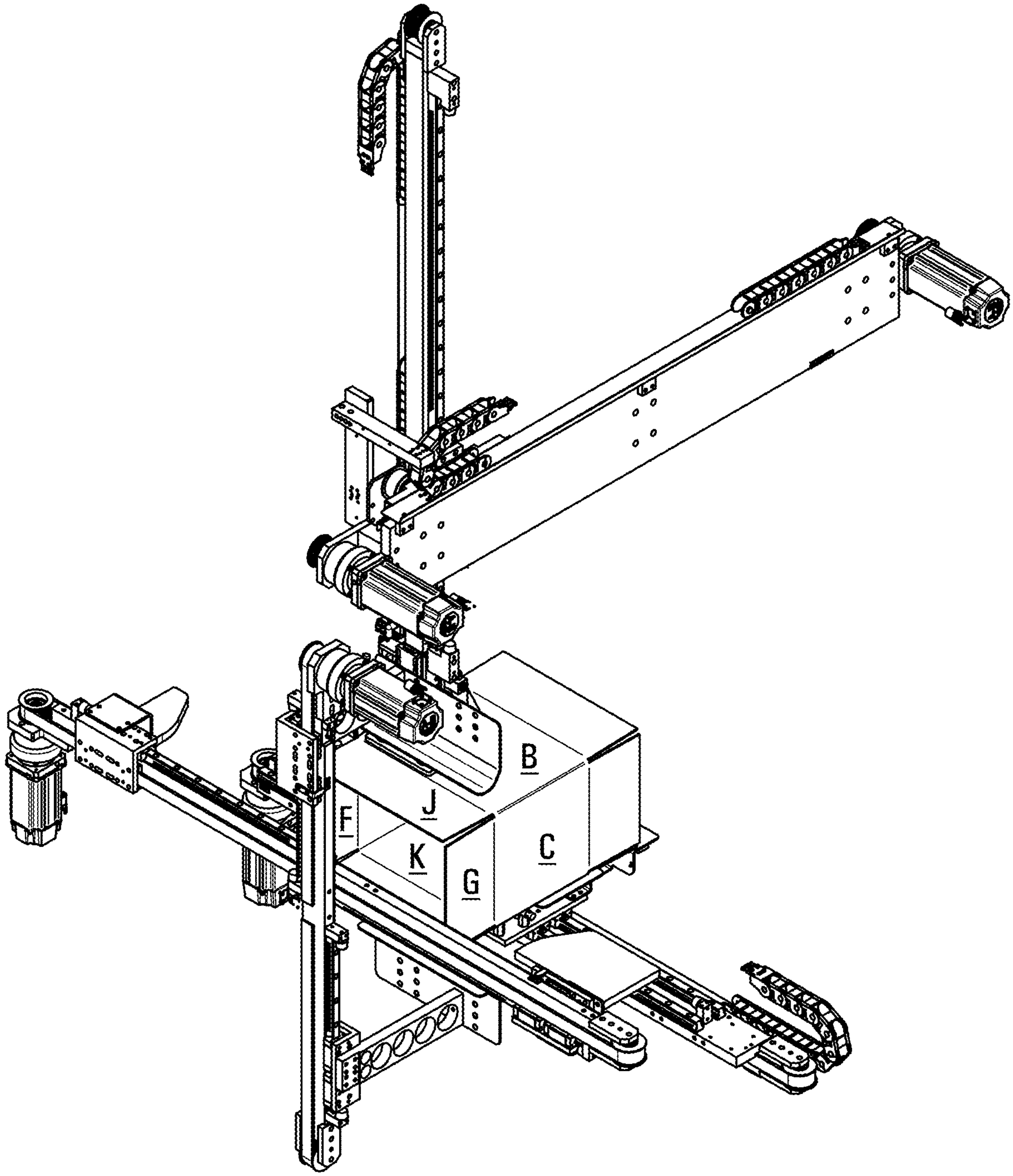

The end effector 120 continues to move vertically upwardly and the shuttle simultaneously continues to move forwardly until the blank is fully erected into a carton sleeve as illustrated in FIG. 19. The PLC will recognize this end point due to its knowledge of the dimensions of the sleeve. With the blank formed into a carton sleeve, panel A of the sleeve (seen in FIG. 18) abuts the back wall 404 of the shuttle 140 (step 712).

With panel A abutting the back wall 404 of the shuttle, the suction cups 410 of the back wall are activated so that panel A is gripped by the back wall 404 of the shuttle (step 714). With both panels A and D held by the shuttle, the carton sleeve is held in its erect position without need of support from end effector 120. Therefore, at this stage, the suctions cups 312 of the end effector 120 are de-activated and the end effector is moved away from the shuttle 140 back to the pick-up location (step 716).

Figure 20:
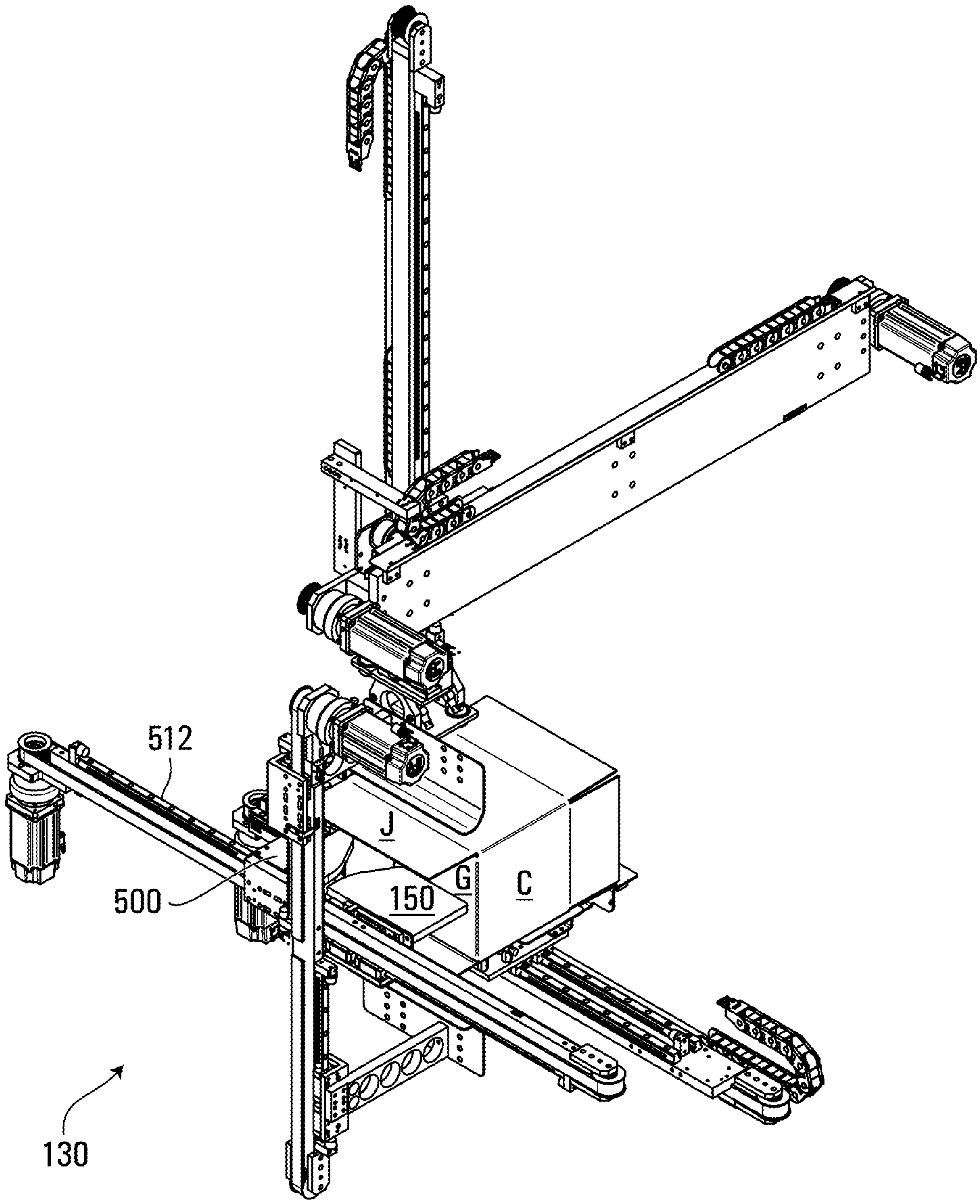
Figure 21:
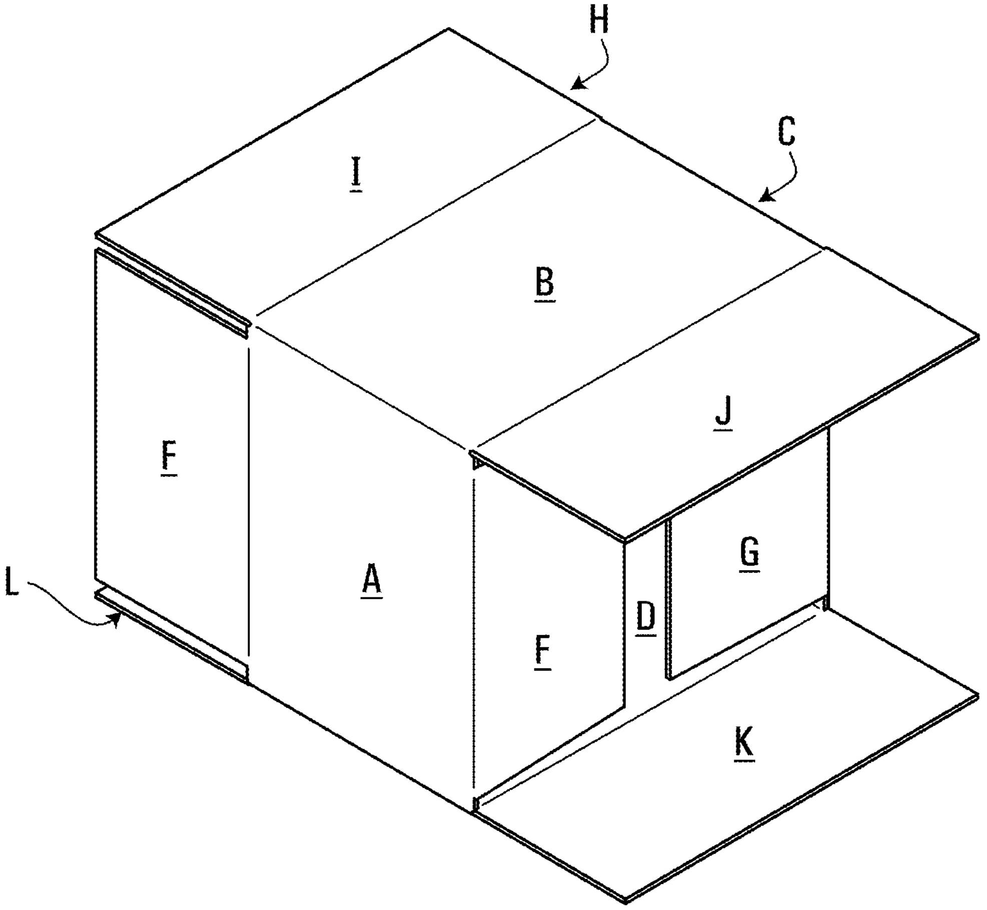
FIGS. 21 and 23 are perspective views of a carton sleeve at different stages of being erected into a carton.

Next, with shuttle 140 held stationary, fin ploughs 500, 510 are moved toward one another until they are adjacent one another as shown in FIG. 20 (step 718). This has the effect of folding minor bottom end panels F and G of the carton sleeve inwardly, as shown in FIG. 21. In this regard, it will be recalled that the vertical position of the fin ploughs 500, 510 was set based on the size of the blank. This setting is so as to result in the fin ploughs contacting panels F and G at their midpoint.

Figure 22:
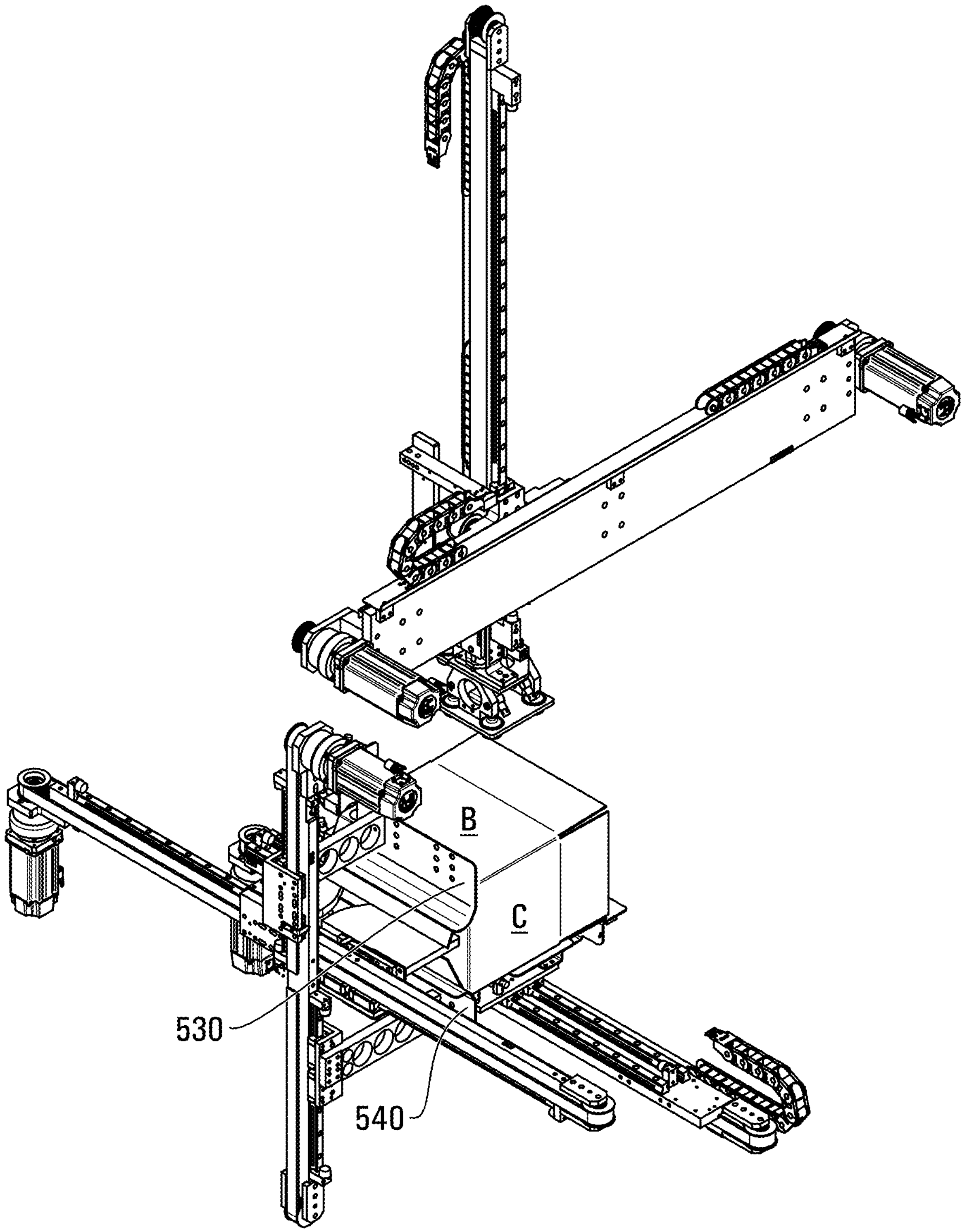
Figure 23:
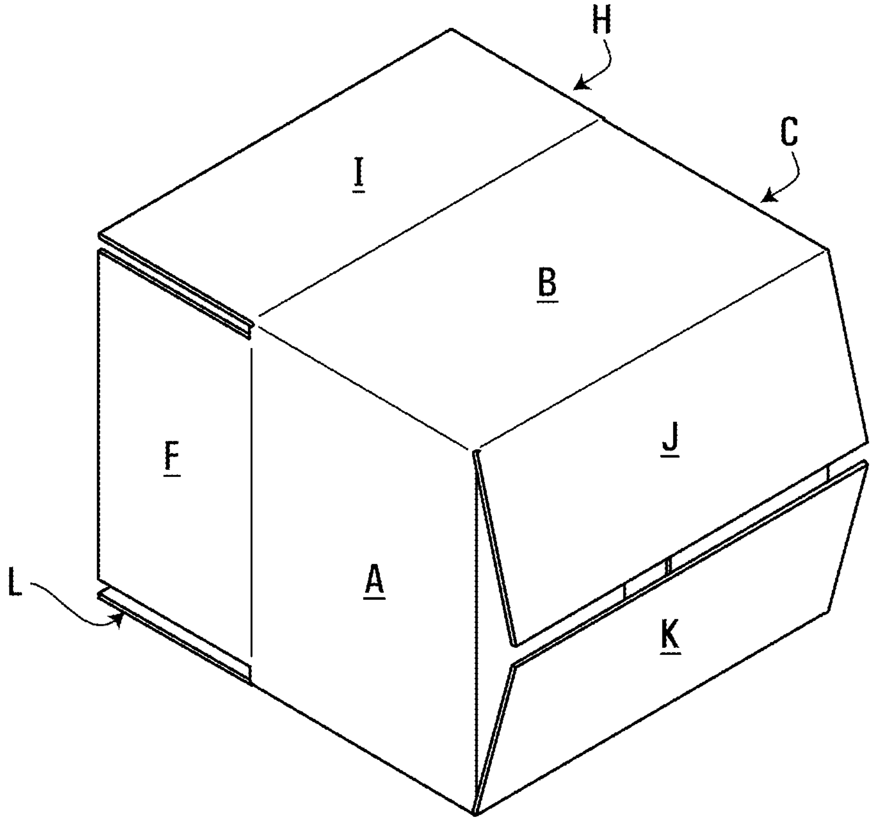

With the shuttle remaining stationary and the fin ploughs remaining adjacent one another, the upper and lower ploughs 530, 540 are next moved toward one another until these ploughs are positioned at a small stand off from fin ploughs 500, 510 as shown in FIG. 22 (step 720). This has the effect of folding major bottom flaps J and K of the carton sleeve inwardly, as shown in FIG. 23.

Leaving all of the ploughs in place, the PLC next activates conveyor belts 600, 610 and moves the shuttle 140 downstream until the belts frictionally grip side panels B and D of the carton sleeve and pull it downstream, extracting it from the ploughs (step 722).

As the sleeve is pulled downstream from the ploughs 500, 510, 530, 540, the outside surface of major bottom flaps J and K are brought into contact with folding rods 632 which progressively complete the fold of flaps J and K. The carton sleeve is then pulled past taping sealer 640 by conveyor belts 600, 610 at which sealer the seam between flaps J and K is taped in order to tape closed the bottom of the carton sleeve to form a carton. The carton is then ejected to the re-orienting station where it is deflected by deflector plates 650, 652 as it falls onto the discharge conveyor 117 so that the bottom of the carton (i.e., flaps J and K) rest on the discharge conveyor. The discharge conveyor then conveys the carton to the output of system 100.

Once the carton sleeve has moved downstream from the ploughs 500, 510, 530, 540, these ploughs are retracted from one another and the shuttle 140 is returned to its initial position in order to prepare system 100 for processing the next carton blank (step 724); the end effector can then pick up the next blank in the stack (step 726).

After exhausting the current stack of blanks, the next stack is conveyed to the information reader 205 and the PLC will read the dimensions of blanks in the next stack (step 726). Thereafter, once the last blank in the current stack has moved downstream of the conveyor belts 600, 610, if the blanks in the next stack have different dimensions from the dimensions of blanks in the now exhausted stack, the PLC adjusts the stroke of the outer side wall 201 and the shuttle 140, the path of end effector 120, and the vertical position of the folding fins 500, 510, the folding ploughs 530, 540, tape sealer 640 with folding rods 632, and upper conveyor 600. System 100 is then readied to handle the next stack and it is moved to the pick-up location and the described processing operations repeated.

The system provides a relatively high processing capacity in part due to the relatively short “stroke” (i.e. longitudinal distance) that the end effector and shuttle must travel when carrying out the blank retrieval and erection. This means that the components do not have to travel such a great distance as in conventional carton erectors.

The system also has a relatively small footprint due to the U-shaped path provided for cartons blanks erected into cartons by the system. More specifically, incoming blanks are conveyed in an upstream X-direction to the pick-up location. These blanks are then conveyed in a Y (and Z) direction to the shuttle where they are then conveyed downstream in the X-direction.

Many variations of the embodiments described above are possible. By way of example the system may employ a second movement apparatus and end effector, identical in construction to movement apparatus 115 and end effector 120, but a mirror image thereof. With such an arrangement, the two devices may be mounted side-by-side with the two end effectors operating in the same plane. Collisions between the two end effectors can be avoided by operating the two movement apparatus such that the two end effectors are always 180° out of phase with one another.

Figure 24:
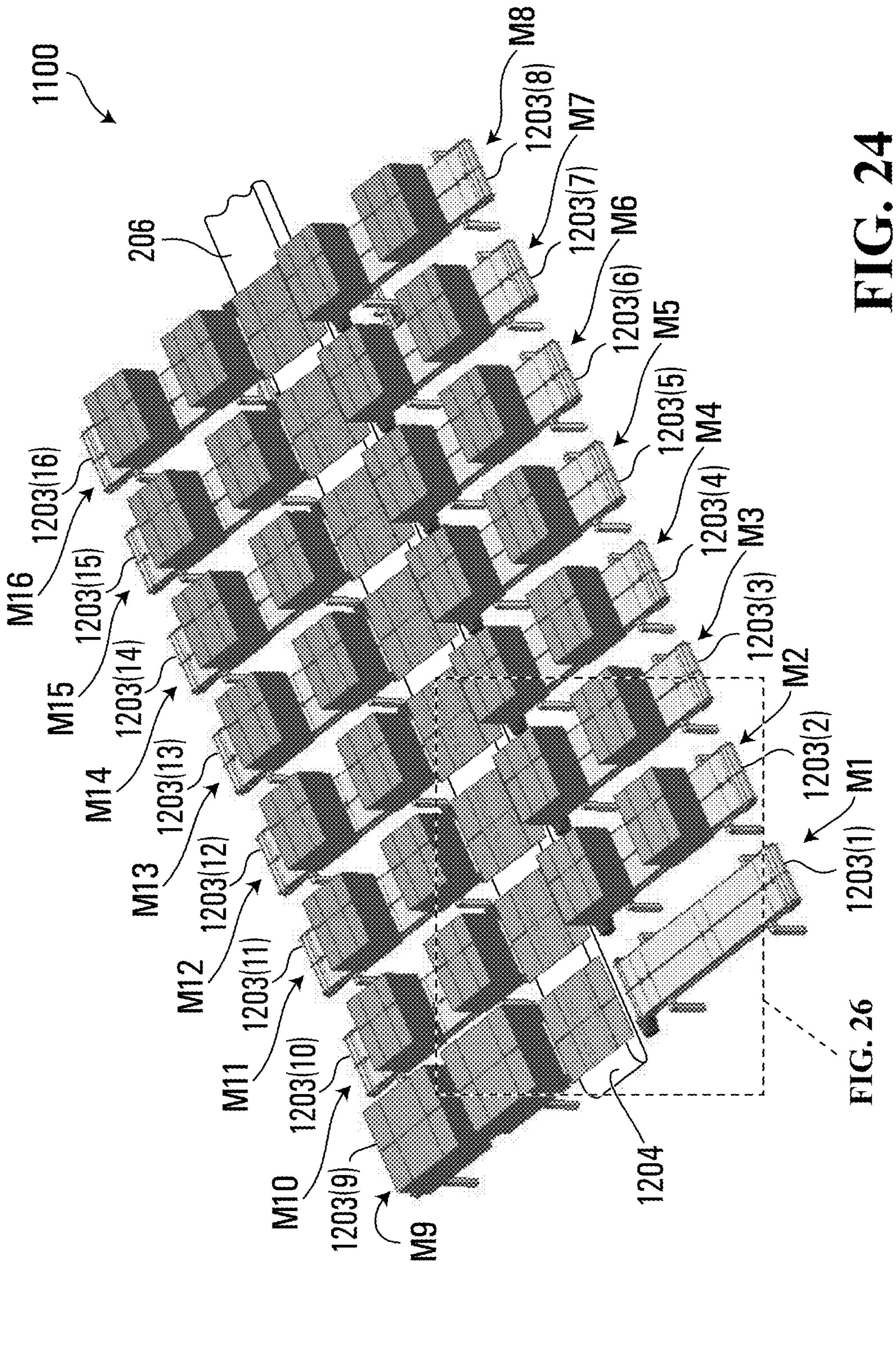
FIG. 24 is a perspective view of an input end of a system made in accordance with another embodiment.
Figure 25:
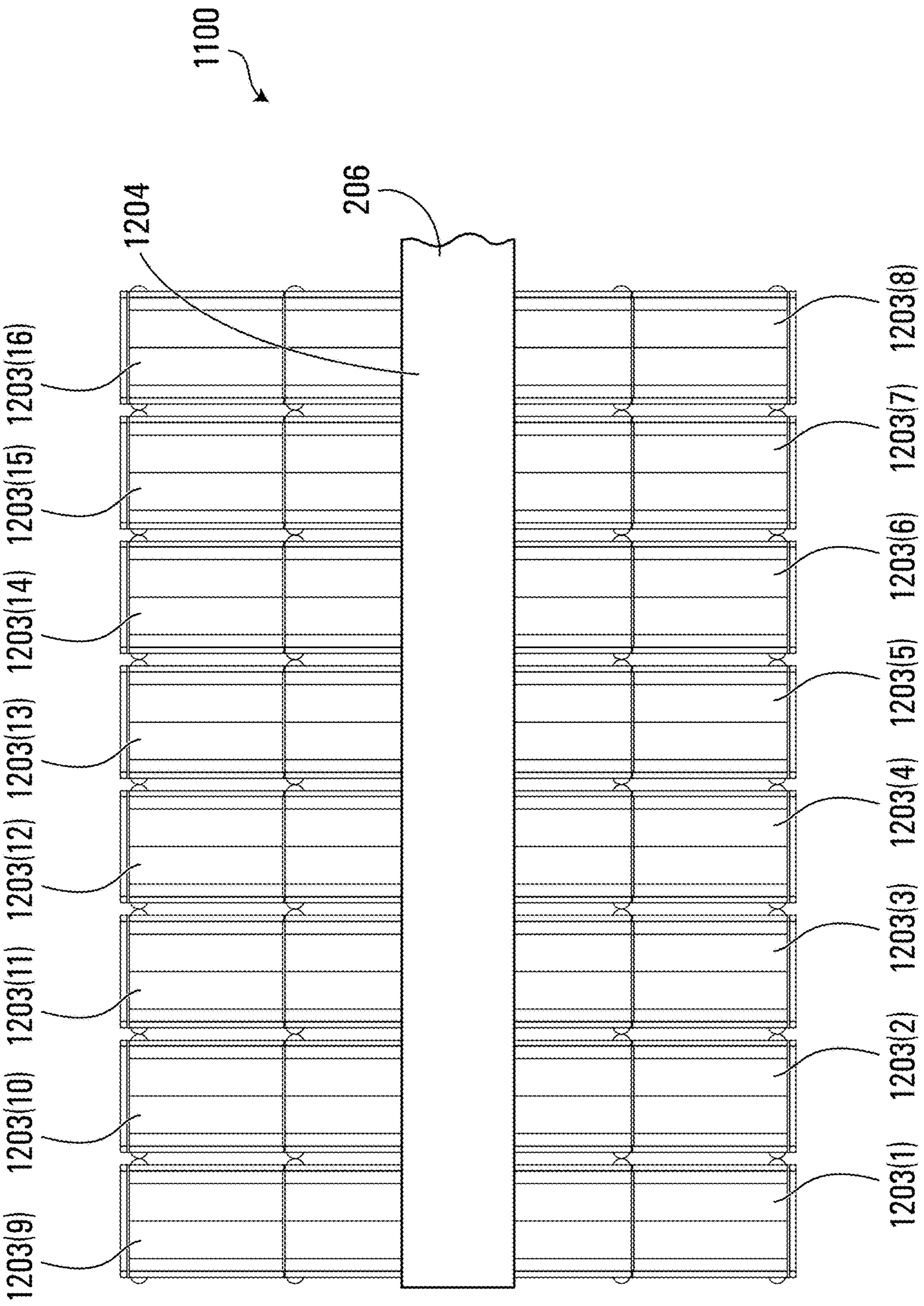
FIG. 25 is a plan view of FIG. 24.

In another embodiment, as an alternate to magazine 110 in carton forming system 100 as described above, a modified carton forming system 1100 may have a plurality of magazines. FIGS. 24 and 25 illustrate the input end of such a modified system 1100 with a plurality of magazines M1-M16 that feed to a common in-feed conveyor 1204. The in-feed conveyor 1204 feeds to alignment conveyor 206, and the remainder of the modified system, being identical to system 100, is not illustrated.

Magazines M1-M16 may each contain one or more stacks of product packaging, such as case blanks which each may generally be like blanks 111 processed by system 100, with at least some of the magazines M1-M16 containing different types/sizes and/or configurations of packaging/case blanks to other magazines. The size, configurations and types of case blanks (and the cases that can be formed therefrom) can vary to provide a range of case sizes, configurations and types that can be automatically processed by the system 1100 without the need for any manual intervention to modify any components of the system. PLC 132 of system 1100 may be programmed such that the particular dimensions/overall size/configuration (e.g. such as regular slotted carton or “RSC”)/type of each of the blanks held in each one of the magazines M1-M16 is stored in the memory of the PLC 132.

Each magazine M1-M16 may have its own blank transfer apparatus that may each include a transversely oriented magazine conveyor 1203(1) to 1203(16) respectively. Each conveyor 1203(1) to 1203(16) (referred to generically as a magazine conveyor 1203) may be controlled by PLC 132, such that a stack of blanks in each magazine M1-M16 may be moved to a position adjacent a longitudinally oriented, central case blank in-feed conveyor 1204. Each magazine M1-M16 may have a transfer apparatus under the control of PLC 132 that is operable to extract and move a blank from a stack in the magazine M1-M16 adjacent to in-feed conveyor 1204 and feed it onto central in-feed conveyor 1204 so that it may be transported.

Figure 26:
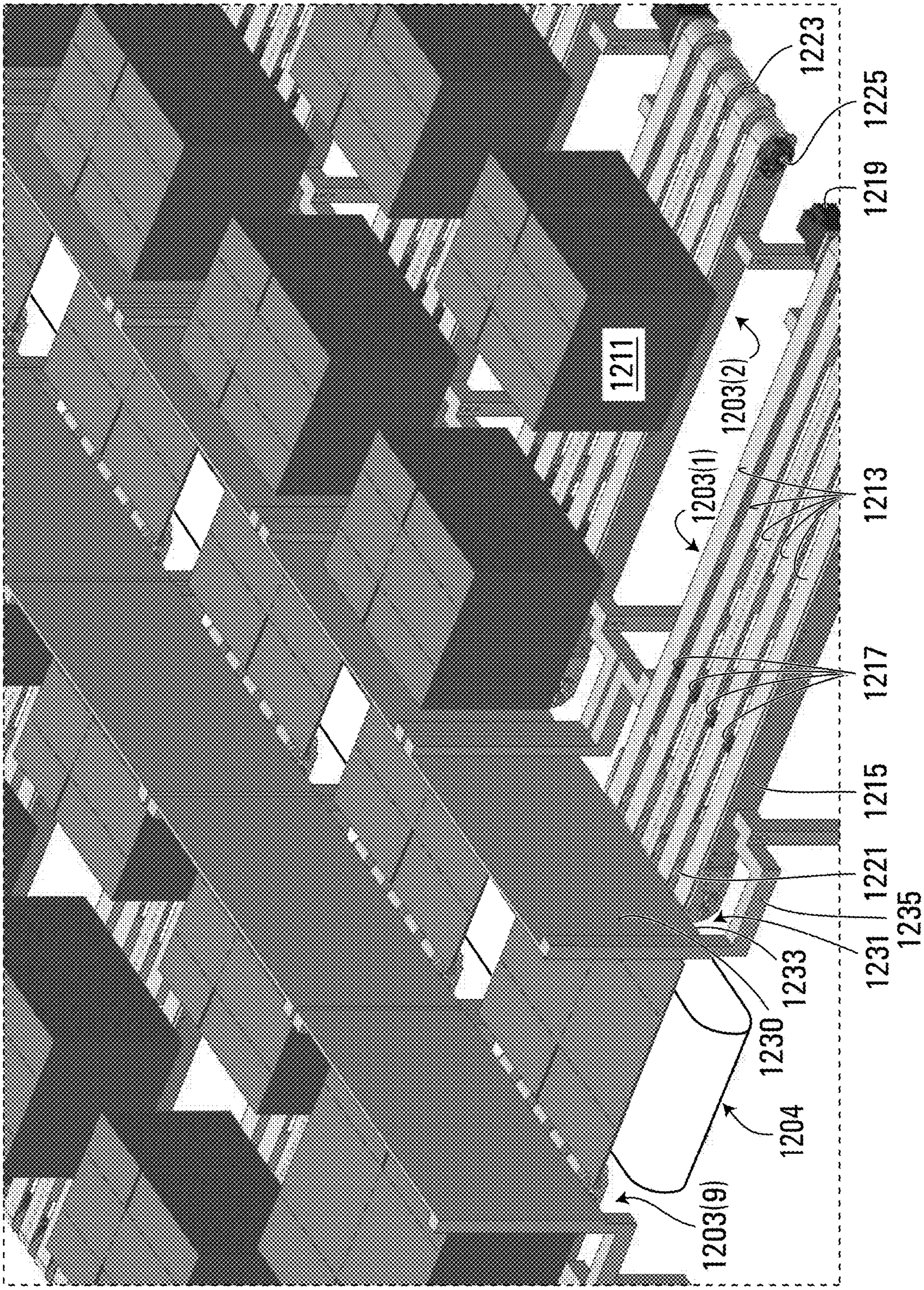
FIG. 26 is a detail perspective view of a portion of FIG. 24.

With reference now to FIG. 26, by way of representative example of the construction of a magazine, magazine conveyor 1203(1) may include a frame 1215 that supports five, generally parallel, and spaced continuous belts 1213 that may be made of any suitable flexible material such as Ropanyl. The belts 1213 may each extend between rotatable idler wheels 1221 mounted on a freely rotatable shaft and rotatable drive wheels 1223. Drive wheels 1223 may be mounted for rotation with and to a common drive shaft 1225 of a servo motor 1219 that may be interconnected via and in communication with a servo drive to the PLC 132 of system 1100. Conveyor belts 1213 may each have an upper belt portion that together may support one or more stacks of blanks 1211 thereon. PLC 132 may give an instruction (such as by order fulfilment processor 1300) to form a case, and if required, PLC 132 may cause upper belt portion of belt 214 to move towards in-feed conveyor 1204 by operation of servo motor 1219 rotating drive wheels 1223. In this way belt 214 can, if necessary, move a stack of blanks 1211 to a position adjacent to the in-feed conveyor 1204.

Positioned proximate the end of each magazine conveyor 1203 adjacent in-feed conveyor 1204 may be a vertically and longitudinally oriented plate 1230 (not shown in FIGS. 24 and 25). Each plate 1230 may be supported by a plurality of plate support members 1235 that may be part of frame 1215. A lower longitudinally extending edge 1233 of plate 1230 may be positioned so that only the bottom blank in a stack of blanks (i.e. the blank that is immediately above the upper portions of the belts) can pass through a slot provided beneath lower edge 1233 of plate 1230 and the horizontal plane formed by the upper surface of the upper portions of the belts 1213. In this way, a slot 1231 can be provided that can permit a single blank at a time from the bottom of the stack to be pushed transversely through the slot and onto the in-feed conveyor 1204.

A pushing mechanism may be provided to respond to signals from PLC 132 of the case former to push a blank in a magazine from the bottom of the stack though the slot 1204 and onto in-feed conveyor 1204. The pushing mechanism may be any suitable type of device and may for example include a plurality of lugs 1217 located in the spaces between belts 1213. The lugs may be driven in a cyclical path by a common type crank mechanism (not shown) that may include a common pneumatic or hydraulic cylinder with a piston controlled by PLC 132 by activating appropriate valves to suitably control the flow of pressurized air/hydraulic fluid to the cylinder. The cylinder may have a piston arm attached to a longitudinally oriented bar member that may be mounted for rotation. The crank mechanism may be configured to provide a path for the lugs 1217 that commences in a position behind the bottom blank in a stack, then moves transversely between the belts 1213 while engaging the rear side edge of the bottom blank thereby pushing the bottom blank through the slot 1231. Once the crank mechanism reaches the end of the stroke, the lugs 1271 will descend downwards beneath the stack of blanks and move transversely in an opposite direction back to the starting position, while at the same time not engaging the next bottom blank on the stack and passing beneath the stack. The path returns the lugs 1217 back to the start position so that when signalled by PLC 132 to load another blank onto conveyor 1204, the operation can be repeated.

In summary, PLC 132 can thus control motor 1219 and thus the movement of each conveyor 1203 as well as the movement of the lugs 1281, and thus is able to selectively move and transfer a single blank at a time onto in-feed conveyor 1204 from any one of magazines M1 to M16.

Therefore, unlike in system 100 where a stack of case blanks may be fed to the alignment conveyor 206 by in-feed conveyor 204, in the modified system separate individual case blanks may be fed in series and longitudinally by in-feed conveyor 1204 to alignment conveyor 206. The particular sequence/order of carton blanks that are placed onto in-feed conveyor 1204 of system 1100 may be determined and selected by PLC 132 such that case blanks may arrive at alignment conveyor 1206 in such a desired manner in which it is desired to process the blanks at least within system 1100.

Further, PLC 132 may maintain in its memory records of case blanks that have been placed onto in-feed conveyor 1204. For example, this information may include the type/size/configuration of the case blank and, where the system 1100 includes a labeller, the label information to be applied to the carton blank. A new record can be added each time a request for a new carton is received and, optionally, records can be removed once a carton has been formed (and labelled). Thus, such records may be organized and maintained in sequence in the memory of PLC 132 using a conventional shift registering technique. In this way, the record for the next carton blank scheduled to arrive at alignment conveyor 206 may be provided at the output of the shift registers as that carton blank arrives, and the type/configuration/size of that carton blank and the label information for that case blank may be determined from the provided output.

Once transferred from in-feed conveyor 1204 to alignment conveyor 206, the alignment conveyor 206 may then under the control of PLC 132 move each blank sequentially to the pick-up location in the manner described previously with respect to system 100. In this regard, conveyor 1204 may be constructed substantially like conveyor 204.

A sensor (not shown) such as an electronic eye model 42KL-D1LB-F4 made by ALLEN BRADLEY, may be located within the horizontal gap between in-feed conveyor 1204 and alignment conveyor 206. The sensor may be positioned and operable to detect the presence of the front edge of a blank as each blank in turn begins to move over the gap between the conveyors. Upon detecting the front edge, sensor may send a digital signal to PLC 132 signalling that a particular blank (the size/configuration/type of which PLC 132 is aware) has moved to a position where conveyor 206 can start to move. PLC 132 can then cause the motor for conveyor 206 to be activated to move the blank downstream. In this way, there can be a "hand-off" of each blank from in-feed conveyor 1204 to alignment conveyor 206.

Once the rear edge of each blank passes the sensor, a signal may be sent to PLC 132 which can then respond by sending a signal to shut down the motor driving conveyor 1204. Conveyor 1204 is then in a condition to await a further signal thereafter to feed the next blank in the series of blanks on the conveyor 1204 to alignment conveyor 206. Meanwhile system 1100 can be operated to move the blank on alignment conveyor 206 to the pick-up location in the manner described in conjunction with system 100 so that processing of the blank can continue as described in conjunction with system 100.

Optionally, PLC 132 may verify that the type/size/configuration of the case blank at the pick-up location matches the expected case blank. For example, the top surface of each case blank may include a bar code identifying its type/size/configuration, and this bar code may be read at the pick-up location by a suitably positioned bar code reader. The type/size/configuration of the case blank read from this bar code may be compared to the expected type/size/configuration of case blank, which may be determined from a record of the next scheduled case blank stored in memory of the PLC, as described above. Verification is successful when there is a match. When there is not a match, PLC 132 may issue a signal requesting manual operator intervention.

The system has been described as having a PLC. Optionally, any other suitable controller may be substituted, such as a programmed general purpose computer.

The carton blank, and resulting sleeve, has been described as being gripped with suction cups. Of course, any other suitable grippers may be employed.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A method of erecting a carton, comprising:

(a) placing a knock-down carton blank on a base of a bed of a shuttle such that a bottom side panel of said knock-down carton blank abuts said base;

(b) gripping said bottom side panel of said blank with a gripper of said base;

(c) raising a top side panel of said knock-down carton blank while advancing said shuttle in a horizontal direction so as to open said knock-down carton blank into a carton sleeve;

wherein a side panel is hingedly connected to said top side panel and to said bottom side panel of said carton blank;

wherein said raising opens said knock-down blank so that said side panel is brought into abutment with a generally vertically extending back wall of said shuttle;

and wherein said method further comprises:

(d) after said raising, gripping said side panel of said knock-down carton blank with a gripper of said back wall;

(e) with said gripper of said back wall gripping said side panel of said knock-down carton blank, releasing said top side panel of said knock-down carton blank.

2. The method of claim 1, wherein said raising comprises raising said top side panel in a vertical direction while advancing said shuttle in said horizontal direction.

3. The method of claim 2, wherein said bed is L-shaped with said base horizontally extending and said vertically extending back wall extending generally orthogonally to said base.

4. The method of claim 1, wherein said placing places a hinge line between said bottom side panel and said further side panel of said carton blank against said vertically extending back wall of said shuttle bed.

5. The method of claim 1, wherein said gripper of said base comprises at least one vacuum cup and wherein said gripping said bottom side panel of said blank comprises activating said at least one vacuum cup.

6. The method of claim 1 further comprising selecting said knock-down carton blank from amongst a plurality of blanks having differing dimensions based on dimensions of said knock-down carton blank, conveying said knock-down carton blank to a pick-up location, and picking up and transferring said knock-down carton blank toward said base.

7. Apparatus for use in erecting a carton, comprising:

a shuttle having a bed with a horizontally extending base having a base grippers;

a shuttle drive apparatus for driving said shuttle in a horizontal advancement direction;

an end effector having an end effector grippers;

an end effector movement device for moving said end effector;

a controller operatively associated with said shuttle drive apparatus, said end effector movement device and said base grippers and said end effector gripper, and configured to:

operate said movement device and end effector to grip a top side panel of a knock-down carton blank and place said knock-down carton blank on said horizontally extending base of said shuttle such that a bottom side panel of said knock-down carton blank abuts said horizontally extending base;

activate said base grippers to grip said bottom side panel of said blank;

operate said movement device to raise said top side panel of said knock-down carton blank with said end effector while horizontally advancing said shuttle in order to open said knock-down carton blank into a carton sleeve;

wherein a side panel is hingedly connected to said top side panel and to said bottom side panel of said carton blank;

wherein said controller is operable to operate said movement device to raise and open said knock-down blank so that said side panel is brought into abutment with a generally vertically extending back wall of said shuttle, and said controller is further operable such that a gripper of said back wall grips said side wall of said knock-down carton blank;

wherein said controller is further operable such that with the gripper of said back wall gripping said side panel of said knock-down carton blank, the gripper of the end effector releases said top side panel of said knock-down carton blank.

8. The apparatus of claim 7, wherein said bed has said back wall having said back wall grippers, said controller is operatively associated with said back wall grippers, and said controller is further configured to operate said back wall grippers to grip a further side panel of said carton sleeve.

9. The apparatus of claim 7, further comprising a pair of horizontally reciprocating ploughs disposed beside said bed and wherein said controller is further configured to, after releasing said top side panel of said knock-down carton blank, advancing said pair of horizontally reciprocating ploughs toward one another to fold minor end flaps of said carton sleeve inwardly toward one another.

10. The apparatus of claim 7 wherein said movement device is operable to:

grip said top side panel of said knock-down carton blank at a pick-up location with an end effector of a movement apparatus;

translate said knock-down carton blank with said movement device from said pick-up location to a position over said shuttle; and vertically lower said knock-down carton blank with said movement apparatus onto said base of said shuttle bed.

11. The apparatus of claim 10, wherein said horizontal direction of advancement of said shuttle is a first horizontal direction and wherein said movement device has two degrees of freedom, a first degree of freedom providing movement of said end effector in a vertical direction and a second degree of freedom providing movement of said end effector in a second horizontal direction transverse to said first horizontal direction.

12. The apparatus of claim 11 further comprising a conveyor operable to convey said knock-down carton blank to said pick-up location in a third horizontal direction that is generally parallel to said first horizontal direction.

13. The apparatus of claim 12 wherein said conveyor is operable to convey said knock-down carton blank to said pick-up location in a third horizontal direction that is opposite to said first horizontal direction.

14. The apparatus of claim 12 wherein said conveyor is operable to convey said knock-down carton blank into abutment with a side wall extending along said third horizontal direction and a front stop at said pick-up location extending transversely of said third horizontal direction in order to precisely locate said knock-down carton blank at said pick-up location.

15. The apparatus of claim 7, wherein said bed is L-shaped with said base horizontally extending and said vertically extending back wall extending generally orthogonally to said base.

16. A method of erecting a container, comprising:

(a) placing a knock-down container blank on a base such that a bottom side panel of said blank abuts said base;

(b) gripping said bottom side panel of said container blank with a gripper of said base;

(c) raising a top side panel of said container blank while providing relative movement of said top side panel relative to said bottom side panel in a horizontal direction so as to open said blank into a container sleeve;

wherein a side panel is pivotally connected to said top side panel and to said bottom side panel of said container blank;

wherein said raising opens said container blank so that said side panel is brought into abutment with a generally vertically extending back member;

and wherein said method further comprises:

(d) after said raising, gripping said side panel of said knock-down carton blank with a gripper of said back member;

(e) while gripping said side panel of said knock-down carton blank with said gripper of said back member, releasing said top side panel of said knock-down carton blank.

17. An apparatus for use in erecting a carton, comprising:

a shuttle having a bed with a horizontally extending base having a base gripper;

a shuttle drive apparatus for driving said shuttle in a horizontal advancement direction;

an end effector having an end effector gripper;

an end effector movement device for moving said end effector;

a controller operatively associated with said shuttle drive apparatus, said end effector movement device and said base gripper and said end effector gripper, and configured to:

operate said movement device and end effector to grip a top side panel of a knock-down carton blank and place said knock-down carton blank on said horizontally extending base of said shuttle such that a bottom side panel of said knock-down carton blank abuts said horizontally extending base;

activate said base grippers to grip said bottom side panel of said blank;

operate said movement device to raise said top side panel of said knock-down carton blank with said end effector while providing relative horizontal movement between said movement device and said shuttle in order to open said knock-down carton blank into a carton sleeve;

wherein a side panel is pivotally connected to said top side panel and to said bottom side panel of said carton blank;

wherein said controller is operable to operate said movement device to raise and open said knock-down blank so that said side panel is brought into abutment with a generally vertically extending back portion of said shuttle, and said controller is further operable such that after said raising, a gripper of said back portion grips said side wall of said knock-down carton blank;

wherein said controller is further operable such that while the gripper of said back portion grips said side panel of said knock-down carton blank, the gripper of the end effector releases said top side panel of said knock-down carton blank.

18. A method for use in erecting a carton, comprising:

(a) placing a knock-down carton blank on a base of a bed of a shuttle such that a bottom side panel of said knock-down carton blank abuts said base;

(b) gripping said bottom side panel of said blank with a gripper of said base;

(c) raising a top side panel of said knock-down carton blank with an end effector of a movement apparatus while advancing said shuttle in a horizontal direction so as to open said knock-down carton blank into a carton sleeve;

wherein said horizontal direction of advancement of said shuttle is a first horizontal direction and wherein said movement apparatus has two degrees of freedom, a first degree of freedom providing movement of said end effector in a vertical direction and a second degree of freedom providing movement of said end effector in a second horizontal direction transverse to said first horizontal direction.

19. The method of claim 18, further comprising conveying said knock-down carton blank to a pick-up location in a third horizontal direction opposite to said first horizontal direction.

20. The method of claim 19, wherein said conveying said knock-down carton blank further comprises conveying said knock-down carton blank into abutment with a side wall extending along said third horizontal direction and a front stop at said pick-up location extending transversely of said third horizontal direction in order to precisely locate said knock-down carton blank at said pick-up location.

21. An apparatus for use in erecting a carton, comprising:

a conveyor for conveying a knockdown carton to a pick-up location;

a shuttle having a bed with a horizontally extending base having a base gripper;

a shuttle drive apparatus for driving said shuttle in a horizontal advancement direction;

an end effector having an end effector gripper;

an end effector movement device for moving said end effector;

a controller operatively associated with said shuttle drive apparatus, said end effector movement device and said base gripper and said end effector gripper, and configured to:

operate said movement device and end effector to grip a top side panel of a knock-down carton blank and place said knock-down carton blank on said horizontally extending base of said shuttle such that a bottom side panel of said knock-down carton blank abuts said horizontally extending base;

activate said base gripper to grip said bottom side panel of said blank;

operate said movement device to raise said top side panel of said knock-down carton blank with said end effector while horizontally advancing said shuttle in order to open said knock-down carton blank into a carton sleeve;

wherein said horizontal direction of advancement of said shuttle is a first horizontal direction and wherein said end effector movement device has two degrees of freedom, a first degree of freedom providing movement of said end effector in a vertical direction and a second degree of freedom providing movement of said end effector in a second horizontal direction transverse to said first horizontal direction.

22. The apparatus of claim 21, wherein said conveyor is operable to convey said knock-down carton blank to said pick-up location in a third horizontal direction opposite to said first horizontal direction.

23. The apparatus of claim 22, wherein said apparatus is operable to convey said knock-down carton blank into abutment with a side wall extending along said third horizontal direction and a front stop at said pick-up location extending transversely of said third horizontal direction in order to precisely locate said knock-down carton blank at said pick-up location.

* * * * *